US009682737B2

(12) United States Patent
Mori et al.

(10) Patent No.: US 9,682,737 B2
(45) Date of Patent: Jun. 20, 2017

(54) VEHICLE WITH SEATING ASSEMBLY

(71) Applicant: HONDA MOTOR CO., LTD., Minato-ku, Tokyo (JP)

(72) Inventors: Yotaro Mori, Wako (JP); Akira Kashiwagi, Wako (JP); Satoru Nojima, Wako (JP); Naoto Yamagishi, Wako (JP); Jun Tanaka, Wako (JP); Yasushi Miyagi, Wako (JP); Akito Hiramatsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/863,646

(22) Filed: Sep. 24, 2015

(65) Prior Publication Data

US 2016/0090137 A1 Mar. 31, 2016

(30) Foreign Application Priority Data

Sep. 30, 2014 (JP) ................. 2014-202446

(51) Int. Cl.
*B62J 1/10* (2006.01)
*B62J 1/26* (2006.01)
*B62J 99/00* (2009.01)
*B62J 1/28* (2006.01)
*B60N 2/39* (2006.01)
(Continued)

(52) U.S. Cl.
CPC .............. *B62J 1/28* (2013.01); *B60N 2/0244* (2013.01); *B60N 2/0248* (2013.01); *B60N 2/0252* (2013.01); *B60N 2/1821* (2013.01); *B60N 2/39* (2013.01); *B60N 2/40* (2013.01); *B62J 1/04* (2013.01); *B62J 1/10* (2013.01); *B62J 1/12* (2013.01); *B62J 99/00* (2013.01); *B62J 2099/0013* (2013.01)

(58) Field of Classification Search
CPC ......... B62J 1/28; B62J 1/04; B62J 1/12; B62J 1/10; B62J 99/00; B62J 2099/0013; B60N 2/1821; B60N 2/0252; B60N 2/40; B60N 2/0248; B60N 2/0244; B60N 2/39
See application file for complete search history.

(56) References Cited

U.S. PATENT DOCUMENTS

| 2005/0236203 | A1* | 10/2005 | Toftner | ...................... | B62J 1/12 |
| | | | | | 180/219 |
| 2009/0198405 | A1* | 8/2009 | Isono | ................. | B60G 17/0164 |
| | | | | | 701/31.4 |
| 2011/0193375 | A1* | 8/2011 | Dohmen | .................... | B62J 1/12 |
| | | | | | 297/195.1 |

FOREIGN PATENT DOCUMENTS

JP 2008-081083 A 4/2008

OTHER PUBLICATIONS

JP 2008-081083, Machine Translation, printed Aug. 17, 2016.*

* cited by examiner

*Primary Examiner* — Redhwan K Mawari
*Assistant Examiner* — Alan D Hutchinson
(74) *Attorney, Agent, or Firm* — Carrier Blackman & Associates, P.C.; Joseph P. Carrier; Anne G. Sabourin

(57) ABSTRACT

A vehicle is disclosed with a seating assembly which is capable of prompting an occupant to take an appropriate riding posture depending on the behavior of the vehicle body. A motorcycle includes tilting mechanisms for tilting seating surfaces of a front seat (rider seating part) and a rear seat (passenger seating part) and an ECU carries out a control process for tilting the seating surfaces to lift rear portions of the seats upwardly in response to an action to accelerate the motorcycle and a control process for tilting (Continued)

the seating surfaces to lift front portions of the seats upwardly in response to an action to decelerate the motorcycle.

10 Claims, 13 Drawing Sheets

(51) Int. Cl.
*B62J 1/04* (2006.01)
*B62J 1/12* (2006.01)
*B60N 2/02* (2006.01)
*B60N 2/18* (2006.01)
*B60N 2/40* (2006.01)

VEHICLE WITH SEATING ASSEMBLY

BACKGROUND

The present disclosure relates to a vehicle with a seating assembly for occupants to be seated thereon.

Japanese Patent Laid-Open No. 2008-081083 proposed vehicles such as motorcycles or the like which include a tilting mechanism for changing the position of a front seat depending on the vehicle speed. Japanese Patent Laid-Open No. 2008-081083 is aimed at taking a seat position depending on the vehicle speed for planting better footing and reducing air resistance.

SUMMARY

Heretofore, there have been vehicles where the seat position is variable depending on, for example, the vehicle speed, but they have not been designed to give consideration to vehicle body behavior depending on the acceleration or the like of the vehicle.

The rider of a two-wheeled vehicle can ride the vehicle more comfortably with fun by taking an appropriate riding posture on the basis of a different vehicle body behavior even if the vehicle speed remains unchanged.

If a novice who is not accustomed to driving a two-wheeled vehicle is prompted to take an appropriate riding posture on the vehicle, then their driving skill can be improved and they can ride the vehicle with more fun.

On tandem riding, the passenger on the vehicle may be moved as the vehicle is accelerated or decelerated by the rider who maneuvers the vehicle. It is difficult for the passenger to predict exactly how the rider will maneuver the vehicle though the passenger is aware of the direction in which the vehicle is going.

Since the riding posture of the passenger affects the driving of the vehicle, the rider can enjoy tandem riding more if movement of the passenger is properly restrained.

The present disclosure is made in view of the above problems. It is an object of the present disclosure to provide a vehicle with a seating assembly which is capable of prompting an occupant to take an appropriate riding posture depending on the behavior of the vehicle body.

The present disclosure provides vehicle including a seating assembly for an occupant to be seated thereon and a tilting mechanism tilting the seating assembly, the vehicle including a controller configured to control the tilting mechanism, wherein the tilting mechanism serves as a mechanism tilting a seating surface of the seating assembly, and the controller carries out at least either one of a control process for tilting the seating surface such that the seating assembly has a rear portion lifted upwardly on the basis of acceleration of the vehicle and a control process for tilting the seating surface such that the seating assembly has a front portion lifted upwardly on the basis of deceleration of the vehicle.

In the above arrangement, the controller may decide that the vehicle is ready to start when a clutch of the vehicle cuts off power transmission and a transmission of the vehicle is in other than a neutral position if the vehicle speed of the vehicle is zero, and carry out the control process for tilting the seating surface such that the seating assembly has the rear portion lifted upwardly when the controller decides that the vehicle is ready to start, and carry out a control process for returning the seating surface into a neutral position in which the seating surface lies flatwise horizontally when the controller decides that the vehicle is not ready to start.

In the above arrangement, the controller may carry out the control process for tilting the seating surface such that the seating assembly has the rear portion lifted upwardly when the vehicle is having a positive acceleration equal to or greater than a predetermined value if the vehicle speed of the vehicle is other than zero, carry out the control process for tilting the seating surface such that the seating assembly has the front portion lifted upwardly when the vehicle is having a negative acceleration smaller than the predetermined value, and carry out the control process for returning the seating surface into the neutral position in which the seating surface lies flatwise horizontally when the acceleration of the vehicle falls within a predetermined range.

In the above arrangement, an angle of the seating surface of the seating assembly is changed depending on the acceleration of the vehicle in the control process for tilting the seating surface.

In the above arrangement, the tilting mechanism may include a base supported on a frame of the vehicle, a seat tiltably mounted on the base, and an actuator tilting the seat.

In the above arrangement, the seat may be mounted on the base for vertical swinging movement about a swing shaft, and an end of a link arm is coupled to a portion of the seat which is spaced from the swing shaft, and the seat may be tilted when another end of the link arm is moved by the actuator.

In the above arrangement, the vehicle may include a roller mounted on either one of the base and the seat, and a rail mounted on the other one of the base and the seat and having a slanted surface for tilting the seat in response to rolling movement of the roller, wherein the actuator may move the seat to cause the roller to roll on the slanted surface of the rail.

In the above arrangement, the roller may include a plurality of rollers spaced laterally on a front lower portion of the seat and a plurality of rollers spaced laterally on a rear lower portion of the seat.

In the above arrangement, the actuator may include expandable bodies disposed forwardly and rearwardly of the swing shaft and a fluid pump expanding or contracting the expandable bodies to tilt the seat.

In the above arrangement, the seat may include seats disposed in front and rear portions of the seating assembly.

In the above arrangement, the tilting mechanism may include a plurality of seats tiltably mounted on a frame member of the seating assembly and tilting each of front and rear portions of the seating surface, and an actuator tilting each of the seats.

As disclosed, the tilting mechanism is a mechanism for tilting the seating surface of the seating assembly for the occupant to be seated thereon, and the controller for controlling the tilting mechanism carries out at least one of the control process for tilting the seating surface such that the seating assembly has the rear portion lifted upwardly in response to an action to accelerate the vehicle and the control process for tilting the seating surface such that the seating assembly has the front portion lifted upwardly in response to an action to decelerate the vehicle. Therefore, the occupant is prompted to take an appropriate riding posture depending on the behavior of the vehicle body, and is notified of a change in the behavior of the vehicle.

The controller decides that the vehicle is ready to start when the clutch of the vehicle cuts off power transmission and the transmission of the vehicle is in other than the neutral position if the vehicle speed of the vehicle is zero, and carries out the control process for tilting the seating surface such that the seating assembly has the rear portion lifted upwardly when the controller decides that the vehicle is ready to start, and carry out the control process for returning the seating surface into the neutral position in which the seating surface lies flatwise horizontally when the controller decides that the vehicle is not ready to start. Therefore, the occupant is prompted to take an appropriate riding posture in preparation for starting the vehicle, and is notified of the starting of the vehicle.

The controller carries out the control process for tilting the seating surface such that the seating assembly has the rear portion lifted upwardly when the vehicle is having a positive acceleration equal to or greater than the predetermined value if the vehicle speed of the vehicle is other than zero, carries out the control process for tilting the seating surface such that the seating assembly has the front portion lifted upwardly when the vehicle is having a negative acceleration smaller than the predetermined value, and carries out the control process for returning the seating surface into the neutral position in which the seating surface lies flatwise horizontally when the acceleration of the vehicle falls within a predetermined range. Therefore, the occupant is prompted to take an appropriate riding posture depending on whether the vehicle is accelerated or decelerated during driving, and is notified of the acceleration or deceleration of the vehicle.

An angle of the seating surface of the seating assembly is changed depending on the acceleration of the vehicle in the control process for tilting the seating surface. It is thus possible to indicate a change in the acceleration or deceleration and the degree of the acceleration or deceleration to the occupant.

The tilting mechanism includes the base supported on the frame of the vehicle, the seat tiltably mounted on the base, and an actuator for tilting the seat. The load applied from the occupant to the seat is borne by the frame of the vehicle, and the actuator is able to tilt the seat appropriately.

The seat is mounted on the base for vertical swinging movement about the swing shaft, and the end of the link arm is coupled to the portion of the seat which is spaced from the swing shaft, and the seat is tilted when another end of the link arm is moved by the actuator. The seat can thus be tilted by a simple structure.

There are provided the roller mounted on either one of the base and the seat, and the rail mounted on the other one of the base and the seat and having the slanted surface for tilting the seat in response to rolling movement of the roller, wherein the actuator moves the seat to the side on which the roller rolls on the slanted surface of the rail. Therefore, the seat can be tilted with low friction by the combination of the roller and the rail.

The roller includes the plurality of rollers spaced laterally on the front lower portion of the seat and the plurality of rollers spaced laterally on the rear lower portion of the seat. The load acting on the seat is thus distributed and borne by the frame of the vehicle, thereby making it possible to tilt the seat smoothly.

The actuator includes the expandable bodies disposed forwardly and rearwardly of the swing shaft and the fluid pump expanding or contracting the expandable bodies to tilt the seat. Therefore, it is possible to resiliently bear the load applied to the seat.

The seat includes the pair of seats disposed respectively in the front and rear portions of the seating assembly. Therefore, the front and rear portions of the seating assembly can independently be controlled for achieving various tilted positions.

The tilting mechanism includes the plurality of seats tiltably mounted on the frame member of the seating assembly tilting the respective front and rear portions of the seating surface, and the actuator tilting each of the seats. The tilting mechanism is thus supported using the frame member of the seating assembly, and the front and rear portions of the seating surface can independently be controlled for achieving various tilted positions.

DETAILED DISCLOSURE

Figure 1:
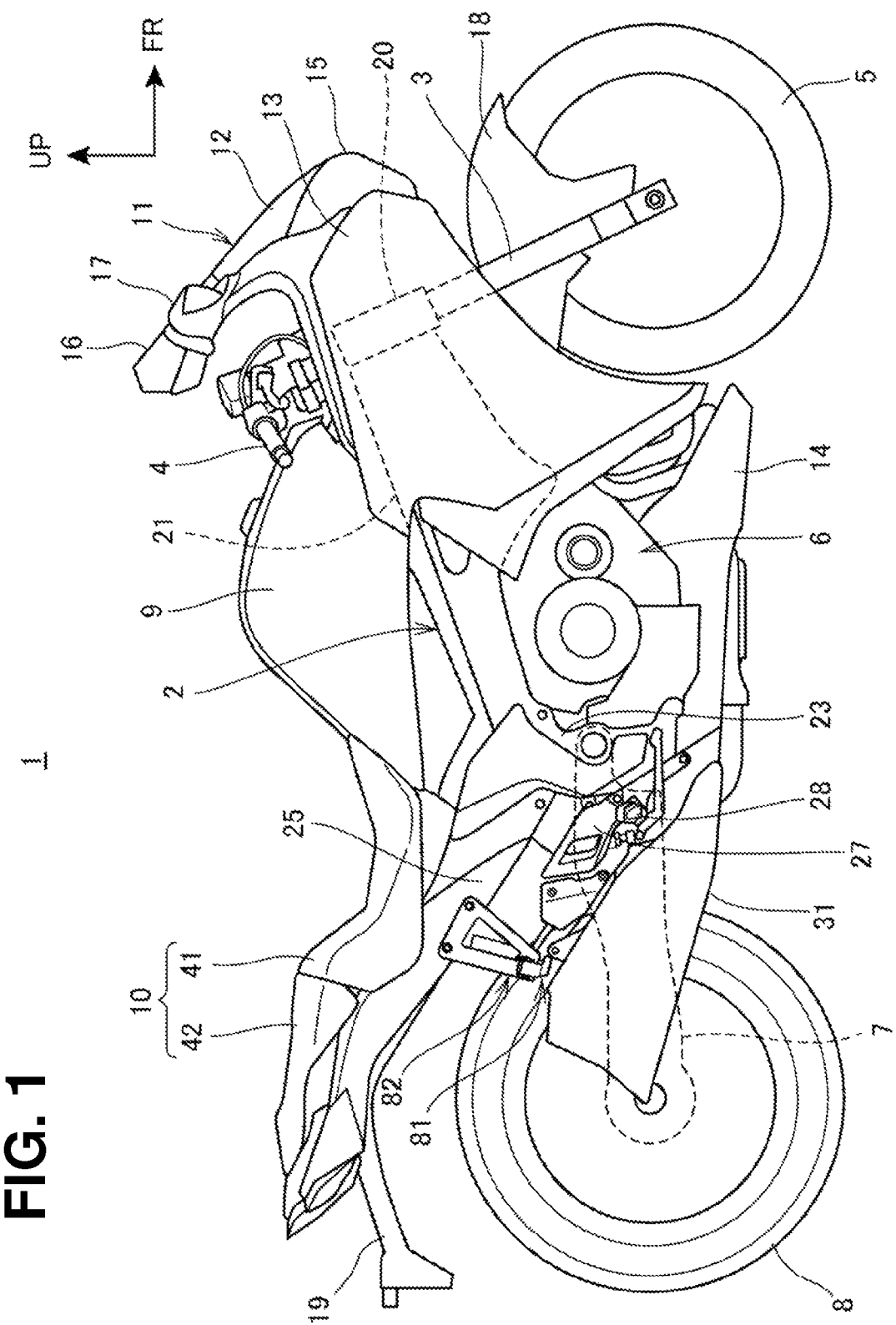
FIG. 1 is a left side elevational view of a motorcycle.

Motorcycles according to this disclosure will be described below with reference to the drawings. In the description that follows, directions such as forward, rearward, leftward, rightward, upward, and downward directions are equivalent to those used with respect to a vehicle body unless specifically described. In the drawings, the reference characters FR represent a forward direction of the vehicle body, UP an upward direction of the vehicle body, and LH a leftward direction of the vehicle body.

FIG. 1 is a left side elevational view of a motorcycle 1. The motorcycle 1 includes a vehicle body frame 2, a pair of left and right front forks 3 steerably supported on a head pipe 20 of the vehicle body frame 2, a steering handle 4 mounted on the upper ends of the front forks 3 and disposed on a front upper portion of the vehicle body, a front wheel 5 rotatably supported on the front forks 3, an engine 6 (power unit) supported on the vehicle body frame 2 substantially at the center of the vehicle body, a swing arm 7 (also referred to as a rear fork) vertically swingably supported on the vehicle body frame 2, a rear wheel 8 rotatably supported on the rear end of the swing arm 7, a fuel tank 9 disposed on an upper portion of the vehicle body frame 2, an occupant seat 10 disposed rearwardly of the fuel tank 9, and a vehicle body cowl 11 covering the vehicle body.

The vehicle body frame 2 includes a pair of left and right main frames 21 extending rearwardly and downwardly from the head pipe 20, a pair of left and right pivot frames 23 connected to rear portions of the main frames 21 and extending downwardly therefrom, and a rear frame 25 extending rearwardly and upwardly from upper portions of the pivot frames 23.

The engine 6 has a front upper portion supported on the main frames 21 and a rear portion supported on the pivot frames 23, so that the engine 6 is supported downwardly of the main frames 21 and forwardly of the pivot frames 23. The engine 6 includes a four-cylinder engine having a transmission mechanism and a clutch mechanism, not shown. The transmission mechanism is able to change gears between 1st through 6th speeds, for example, in response to gear shifting actions taken by the rider (driver) of the motorcycle 1. The clutch mechanism is able to interrupt or connect (turn on or off) the transmission of power from the engine 6 to the rear wheel 8 (drive wheel) in response to a clutch action taken by the rider.

The swing arm 7 has a front end angularly movably supported on the pivot frames 23. A pair of left and right main steps 28 (rider steps) for placing the rider's feet thereon are supported on the pivot frames 23 by main step holders 27.

The fuel tank 9, which stores therein a fuel to be supplied to the engine 6, is supported on the main frames 21. The occupant seat 10 is supported on the rear frame 25.

The vehicle body cowl 11, which is of a full cowl type covering the vehicle body essentially in its entirety, includes a front cowl 12 covering a front portion of the vehicle body, a pair of left and right side cowls 13 contiguous to the front cowl 12 and covering left and right sides of the vehicle body, and an under cowl 14 covering a lower portion of the vehicle body.

A headlight 15 is mounted on a front surface of the front cowl 12, and a windscreen (windshield) 16 is mounted on an upper portion of the front cowl 12. Left and right mirrors 17 are mounted on respective left and right sides of the front cowl 12. The motorcycle 1 includes as other cover members a front fender 18 covering an upper portion of the front wheel 5 and a rear fender 19 covering an upper portion of the rear wheel 8. In FIG. 1, the reference numeral 31 represents an exhaust muffler disposed on the right side of the rear wheel 8 for discharging exhaust gases from the engine 6.

The motorcycle 1 is constructed as a two-seater vehicle for the rider and a passenger to ride thereon. The occupant seat 10 is in the form of a seat assembly including a front seat 41 (rider seating part) for the rider to be seated thereon and a rear seat 42 (passenger seating part) for the passenger to be seated thereon, the front seat 41 and the rear seat 42 being separate from each other in the longitudinal directions of the motorcycle 1.

A pair of left and right pillion steps 81 (passenger steps) for placing the passenger's feet thereon are supported on the rear frame 25 by step turning mechanisms 82.

Figure 2:
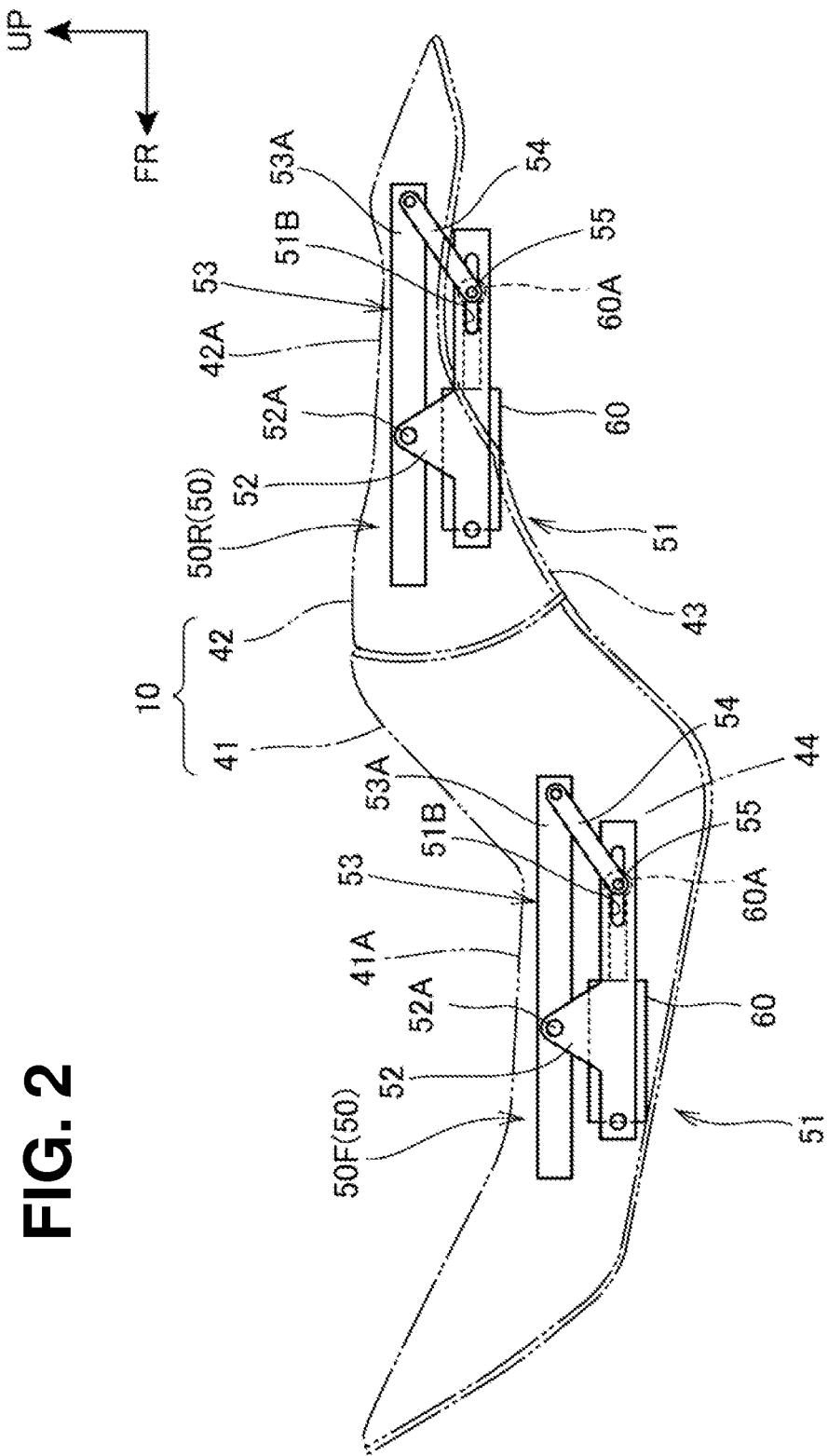
FIG. 2 is a view of an occupant seat as viewed from the left side of a vehicle body.

FIG. 2 is a view of the occupant seat 10 as viewed from the left side of the vehicle body. The occupant seat 10 has a seat bottom plate 43 providing a bottom surface of the occupant seat 10 and a cushion body 44 disposed on the seat bottom plate 43. The seat bottom plate 43 is made of a rigid material such as a resin and is a member also functioning as a seat frame. The cushion body 44 is made of a urethane material molded to a shape suitable as a motorcycle seat and covered with a seat covering. The seat covering that covers the urethane material is fixed to the seat bottom plate 43. The seat structure of the occupant seat 10 is of general nature, and a wide range of known other structures are applicable to the occupant seat 10.

Of the occupant seat 10, the front seat 41 has a seating face 41A which is molded to a downwardly concave shape for accommodating the buttocks of the rider seated on the seating face 41A in its concavity to hold longitudinal movement of the rider to a certain extent. The rear seat 42 has a seating face 42A which is molded to a flat surface extending substantially horizontally rearwardly from the rear end of the seating face 41A of the front seat 41, for thereby keeping the degree of freedom for seating positions and also the degree of freedom with which to deal with passengers of various body shapes.

In FIG. 2, the outer profile of the occupant seat 10 is indicated by the two-dot-and-dash lines. The front seat 41 houses therein a tilting mechanism 50F for tilting the seating face 41A of the front seat 41, whereas the rear seat 42 houses therein a tilting mechanism 50R for tilting the seating face 42A of the rear seat 42.

The tilting mechanisms 50F and 50R are supported on the rear frame 25 that functions as a seat frame. An example of structure with which the tilting mechanisms 50F and 50R that are fixed to the rear frame 25 are housed in the occupant seat 10 will be described below.

Figure 3:
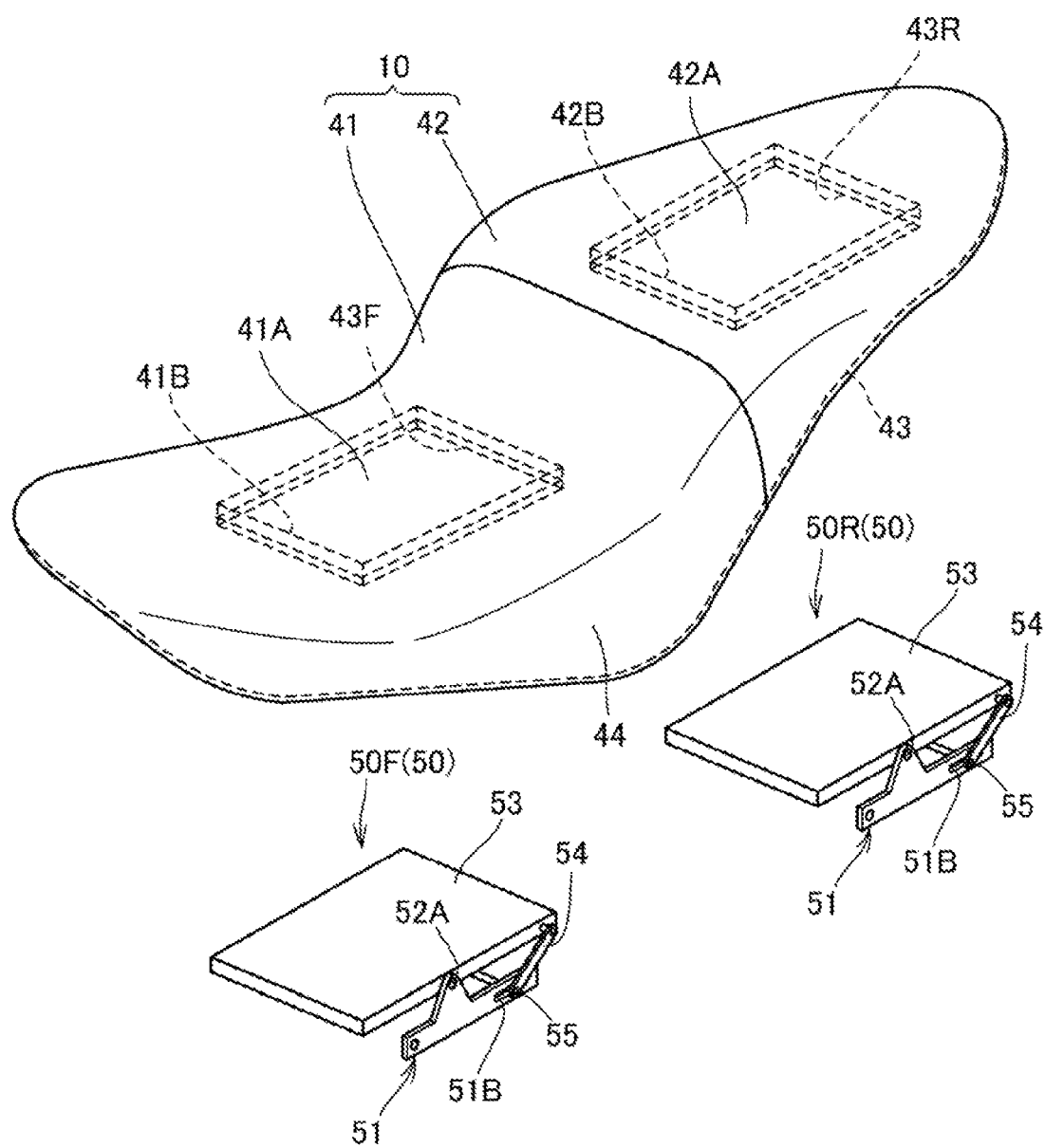
FIG. 3 is a perspective view of the occupant seat removed from the vehicle body.

FIG. 3 is a perspective of the occupant seat 10 removed from the vehicle body. The occupant seat 10 has upwardly recessed cavities 41B and 42B defined respectively in the front seat 41 and the rear seat 42. The cavities 41B and 42B are formed by providing recessed shapes that correspond to the cavities 41B and 42B in the cushion body 44 in the front seat 41 and the rear seat 42 and providing openings 43F and 43R, through which the cavities 41B and 42B are open downwardly, in the seat bottom plate 43.

The tilting mechanisms 50F and 50R are rigidly fixed to the rear frame 25 by fasteners (e.g., fastening bolts). The occupant seat 10 is installed, from above, on the tilting mechanisms 50F and 50R, thereby housing the tilting mechanisms 50F and 50R respectively in the cavities 41B and 42B in the front seat 41 and the rear seat 42.

The tilting mechanisms 50F and 50R are identical in structure to each other, and have identical parts denoted by identical reference characters. The tilting mechanisms 50F and 50R will hereinafter be referred to as a tilting mechanism 50 unless they are to be distinguished from each other. The tilting mechanism 50 will be described below.

As shown in FIGS. 2 and 3, the tilting mechanism 50 includes a pair of left and right bases 51 fixed to the rear frame 25, a pair of left and right swing supports 52 extending upwardly from the respective bases 51, and a seat 53 vertically swingably supported on the swing supports 52 by a swing shaft 52A extending in the transverse directions of the motorcycle 1.

The bases 51 include elongate members which extend in the longitudinal directions of the vehicle body. The bases 51 have grooves 51B defined therein which extend therethrough in the transverse directions of the vehicle body and also extend in the longitudinal directions of the vehicle body.

A single joint shaft 55 that interconnects ends of a pair of left and right link arms 54 is inserted in the grooves 51B in the left and right bases 51. The joint shaft 55 is movable in the grooves 51B in the longitudinal directions of the vehicle body, and the link arms 54 have their proximal ends coupled to the bases 51 for movement along the grooves 51B in the longitudinal directions of the vehicle body. The link arms 54 are in the form of bars whose distal ends angularly movably coupled to the seat 53.

The seat 53 includes a flat plate having a size fitted beneath each of the seating faces 41A and 42A of the front seat 41 and the rear seat 42. The seat 53 is disposed in each of the cavities 41B and 42B in the seats 41 and 42 and has an upper surface 53A held against the lower surface of the cushion body 44. The seat 53 is supported on each of the bases 51 for vertically swinging movement about the swing shaft 52A. The seat 53 has a portion spaced from the swing shaft 52A in a longitudinal direction of the vehicle body (a rearward direction in this approach) and coupled to the distal ends of the link arms 54. Therefore, when the proximal ends of the link arms 54 are moved along the grooves 51B in the bases 51, the seat 53 is angularly moved or turned about the swing shaft 52A, changing its angle of tilt.

The tilting mechanism 50 includes an actuator 60 (FIG. 2) for moving the proximal ends of the link arms 54 along the grooves 51B in the bases 51. The actuator 60 is a linear actuator having a movable member 60A that is linearly movable in the directions along which the grooves 51B extend (in the longitudinal directions of the vehicle body). The actuator 60 is fixed to the rear frame 25 or the bases 51, and the movable member 60A is connected to the joint shaft 55 that interconnects the proximal ends of the left and right link arms 54.

The actuator 60 includes a ball screw mechanism having a ball screw that is rotatable about its own axis by a motor to linearly move the movable member 60A. When the motor is energized to rotate its output shaft in one direction or the other, the movable member 60A is pushed (moved rearwardly) or pulled (moved forwardly). The angular displacement of the output shaft of the motor is controlled to adjust the position of the movable member 60A, thereby changing the position of the proximal ends of the link arms 54 in the longitudinal directions of the vehicle body.

When the position of the proximal ends of the link arms 54 in the longitudinal directions of the vehicle body is changed, the angle of tilt of the seat 53 is changed, causing the cushion body 44 to move the seating surfaces 41A and 42A in a manner to follow the movement of the seat 53, so that the seating surfaces 41A and 42A are tilted essentially in the same manner as the seat 53 is tilted. In this fashion, the seating surfaces 41A and 42A are angularly variable between a neutral position in which the seating surfaces 41A and 42A lie flatwise horizontally, a rear-up position in which the seating surfaces 41A and 42A have rear portions tilted upwardly, and a front-up position in which the seating surfaces 41A and 42A have front portions tilted upwardly.

Figure 4A:
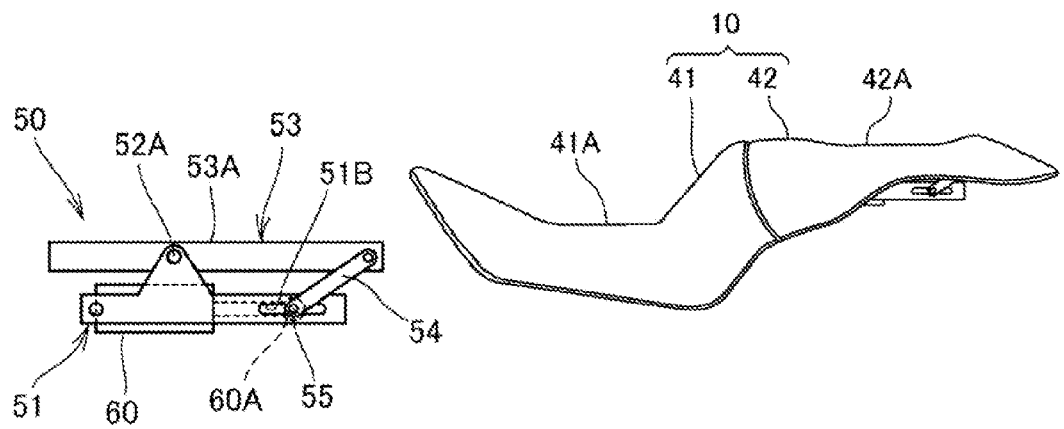
FIG. 4A is a view showing how the postures of a front seat and a rear seat are changed by respective actuators and further showing a state in which both the front seat and the rear seat take a neutral position.
Figure 4B:
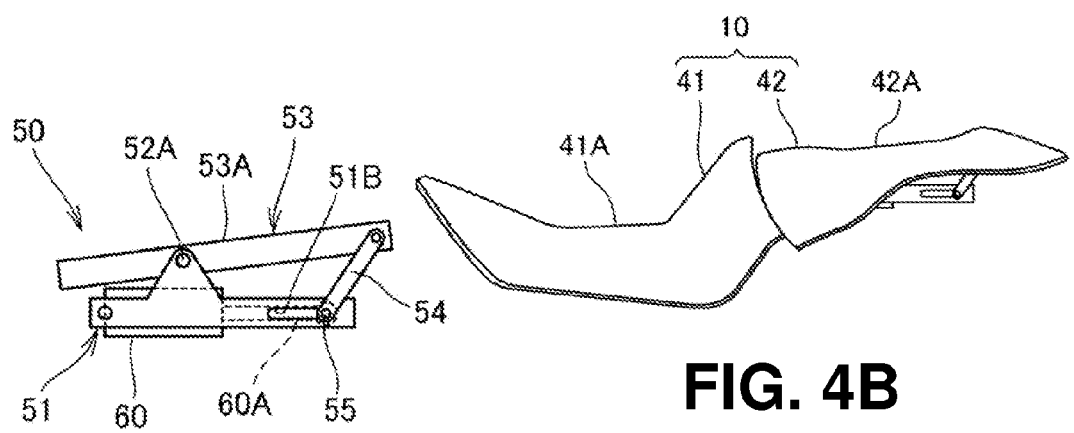
FIG. 4B is a view showing how the postures of a front seat and a rear seat are changed by respective actuators and further showing a state in which the front seat and the rear seat take a rear-up position.
Figure 4C:
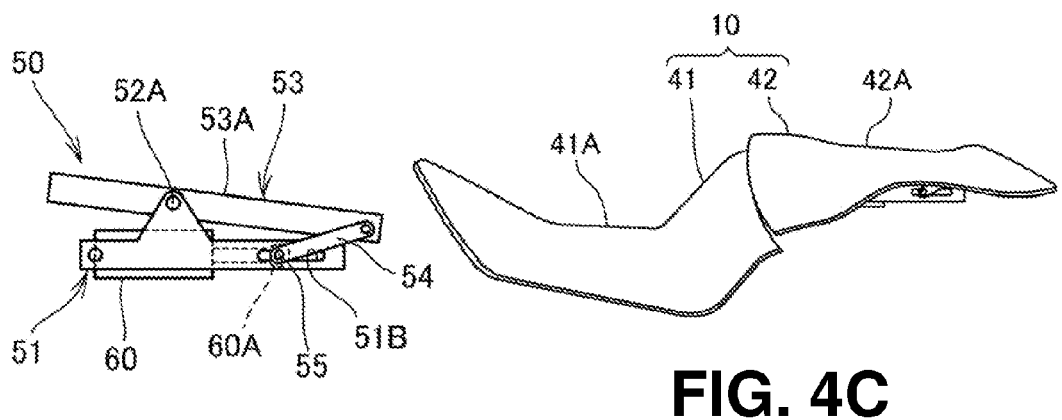
FIG. 4C is a view showing how the postures of a front seat and a rear seat are changed by respective actuators and further showing a state in which the front seat and the rear seat take a front-up position.

FIG. 4 is a view showing how the postures of the front seat 41 and the rear seat 42 are changed by the respective actuators 60, FIG. 4A showing a state in which both the front seat 41 and the rear seat 42 take the neutral position, FIG. 4B a state in which the front seat 41 and the rear seat 42 take the rear-up position, and FIG. 4C a state in which the front seat 41 and the rear seat 42 take the front-up position. The state in which both the front seat 41 and the rear seat 42 take the neutral position is also referred to as a state in which "the occupant seat 10 takes the neutral position." The state in which both the front seat 41 and the rear seat 42 take the rear-up position is also referred to as a state in which "the occupant seat 10 takes the rear-up position." The state in which both the front seat 41 and the rear seat 42 take the front-up position is also referred to as a state in which "the occupant seat 10 takes the front-up position."

As shown in FIG. 4A, when each of the actuators 60 moves the positions of the proximal ends of the link arms 54 to respective longitudinally intermediate positions in the grooves 50B, the upper surface 53A of the seat 53 lies flatwise horizontally, holding the seating surfaces 41A and 42A of the occupant seat 10 in the neutral position where they lie flatwise horizontally, whereupon the occupant seat 10 takes the neutral position.

As shown in FIG. 4B, when each of the actuators 60 moves the positions of the proximal ends of the link arms 54 to respective rear ends of the grooves 51B, the upper surface 53A of the seat 53 is tilted with its rear portion lifted upwardly, holding the seating surfaces 41A and 42A of the occupant seat 10 in the rear-up position where their rear portions are lifted upwardly, whereupon the occupant seat 10 takes the rear-up position.

As shown in FIG. 4C, when each of the actuators 60 moves the positions of the proximal ends of the link arms 54 to respective front ends of the grooves 51B, the upper surface 53A of the seat 53 is tilted with its front portion lifted upwardly, holding the seating surfaces 41A and 42A of the occupant seat 10 in the front-up position where their front portions are lifted upwardly, whereupon the occupant seat 10 takes the front-up position.

According to this approach, when the state in which the occupant seat 10 takes the rear-up position as shown in FIG. 4B is reached in response to an action to accelerate the motorcycle 1, the buttocks of the occupants (rider, passenger) seated on the seating surfaces 41A and 42A of the occupant seat 10 are rendered difficult to move rearwardly, and the centers of gravity of the occupants are shifted forwardly, prompting the occupants to take seating postures in preparation for acceleration.

When the state in which the occupant seat 10 takes the front-up position as shown in FIG. 4C is reached in response to an action to decelerate the motorcycle 1, the buttocks of the occupants seated on the seating surfaces 41A and 42A of the occupant seat 10 are rendered difficult to move forwardly, and the centers of gravity of the occupants are shifted rearwardly, prompting the occupants to take seating postures in preparation for deceleration.

When the state in which the occupant seat 10 takes the neutral position as shown in FIG. 4A is reached in case an action to accelerate the motorcycle 1 or an action to decelerate the motorcycle 1 is not taken, the occupants are prompted to take seating postures not in preparation for acceleration or deceleration or more relaxed seating postures for easily changing seating positions.

Figure 5:
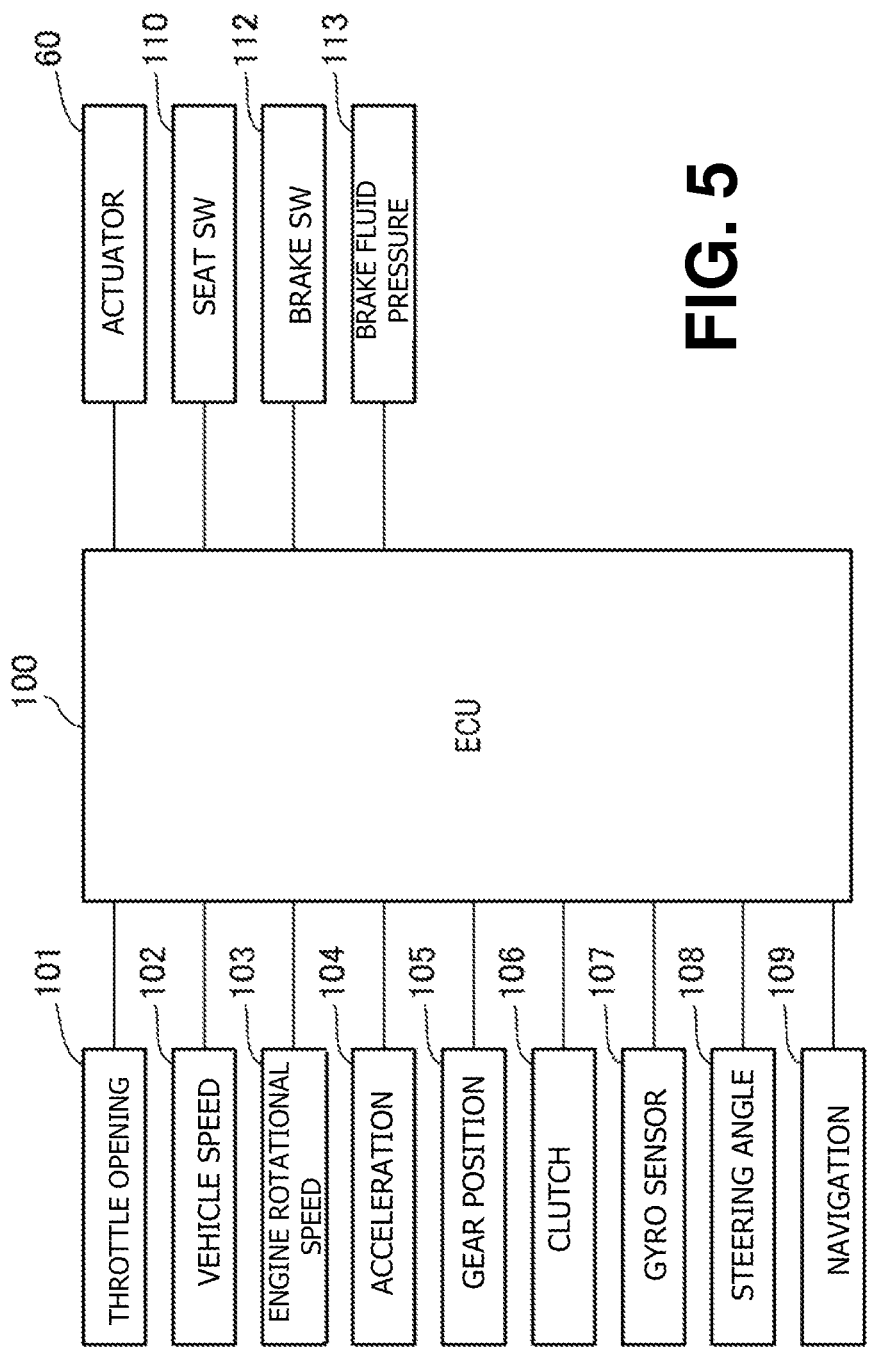
FIG. 5 is a block diagram showing an ECU for controlling the actuators and peripheral devices.

FIG. 5 is a block diagram showing an ECU (Electronic Control Unit) 100 for controlling the actuators 60 and peripheral devices. The ECU 100 is an electric unit including a computer and various electronic parts including at least a memory and a processor in which the memory is a non-transitory computer readable medium for storing data and computer instructions for controlling the processor. The ECU 100 functions as a controller for controlling various components on the vehicle body which include the actuators 60.

As shown in FIG. 5, sensors for detecting information of various areas of the motorcycle 1, switches, etc., as well as the actuators 60, are connected to the ECU 100. Specifically, those sensors and switches include a throttle opening sensor 101 for detecting the opening (throttle opening) of throttle valves actuated by the rider, a vehicle speed sensor 102 for detecting a vehicle speed, an Ne sensor 103 for detecting an engine rotational speed, an acceleration sensor 104 for detecting an acceleration, a gear position sensor 105 for detecting a present gear, a clutch detection switch 106 for detecting the turning-on (transmitted power cut off) or the turning-off (power transmitted) of the clutch mechanism, a gyro sensor 107 (angle-of-tilt sensor) for detecting a tilt (roll angle) of the vehicle body, a steering angle sensor 108 for detecting the steering angle of the front wheel 5 (or the handle 4), a navigation device 109, a seat position sensor 110 for detecting whether or not the seating surface 42A of the rear seat 42 is in a predetermined position (the neutral position in this approach), a brake switch 112 for detecting whether or not the rider is taking an action to brake the motorcycle 1, and a brake fluid pressure sensor 113 for detecting a brake fluid pressure.

The brake fluid pressure sensor 113 detects whether the brake is operating or not, i.e., whether or not the rider is braking the motorcycle 1, on the basis of the brake fluid pressure. The accuracy with which to detect whether or not the rider is braking the motorcycle 1 is made higher by using the signals from both the brake switch 112 and the brake fluid pressure sensor 113 than by using either one of those signals. FIG. 5 shows part of the devices that are connected to the ECU 100. The ECU 100 also performs such as engine control (intake control and ignition control).

Figure 6:
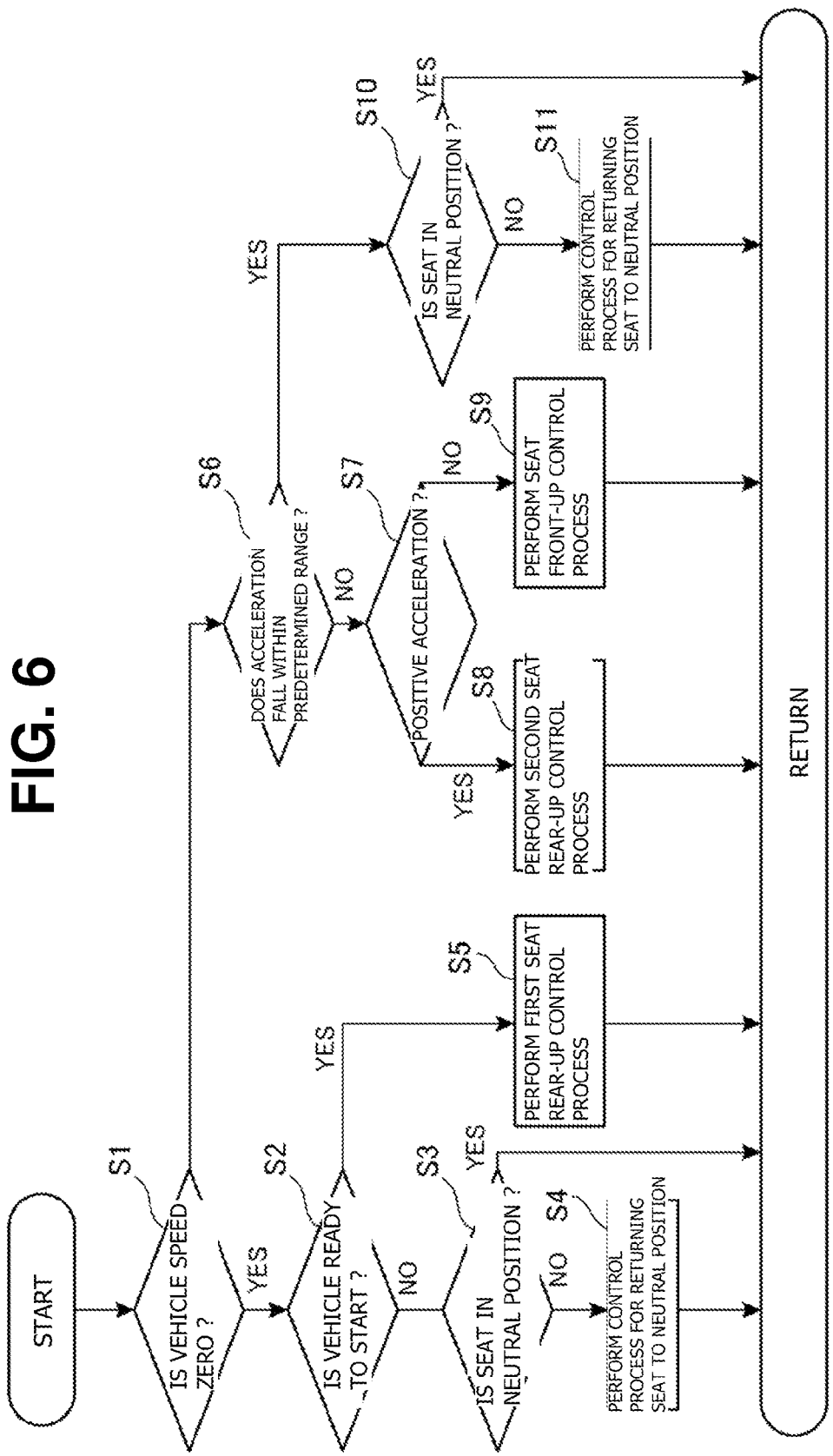
FIG. 6 is a flowchart of a process of controlling the occupant seat.

FIG. 6 is a flowchart of a method of controlling the occupant seat 10. In step S1, the ECU 100 determines whether or not the vehicle speed is zero on the basis of the detected signal from the vehicle speed sensor 102. If the vehicle speed is zero, then the ECU 100 determines whether or not the motorcycle 1 is ready to start (step S2). In step S2, the ECU 100 determines whether or not predetermined conditions for judging that the motorcycle 1 is ready to start are satisfied. More specifically, the ECU 100 decides that the motorcycle 1 is ready to start if the clutch is turned on (transmitted power cut off), the transmission gear is other than a neutral position, and the rider is braking the motorcycle 1, on the basis of the detected signals from such as the clutch detection switch 106, the gear position sensor 105, and the brake switch 112.

If the ECU 100 decides that the motorcycle 1 is not ready to start, then the ECU 100 determines whether or not the front seat 41 and the rear seat 42 take the neutral position, i.e., whether or not the occupant seat 10 takes the neutral position, on the basis of the detected signal from the seat position sensor 110 (step S3). If the front seat 41 and the rear seat 42 do not take the neutral position, then the ECU 100 performs a returning control process for operating the actuators 60 to return the front seat 41 and the rear seat 42 to the neutral position (step S4). In the returning control process, the ECU 100 returns the front seat 41 and the rear seat 42 to the neutral position by smoothly changing the angular velocities of the front seat 41 and the rear seat 42 in order not to make the passenger feel strange and uncomfortable, e.g., performs a velocity control process for changing the angular velocities according to a sine-wave pattern. If the front seat 41 and the rear seat 42 take the neutral position, then the ECU 100 temporarily finishes the control process and thereafter carries out step S1.

If the ECU 100 decides that the motorcycle 1 is ready to start in step S2, then the ECU 100 carries out a first seat rear-up control process (step S5). The first seat rear-up control process is a control process for tilting the rear portions of the front seat 41 and the rear seat 42 upwardly to a predetermined rear-up position (corresponding to the position shown in FIG. 4B). More specifically, the ECU 100 tilts the rear portions of the front seat 41 and the rear seat 42 upwardly stepwise to a stroke position which is up to one half the full stroke thereof. The front seat 41 and the rear seat 52 are now in the state in which they take the occupant seat 10 takes the rear-up position, prompting the occupants seated respectively on the seating surfaces 41A and 42A of the occupant seat 10 to take riding postures in readiness for the starting of the motorcycle 1. Since the rear seat 42 is moved stepwise, the movement of the front seat 41 and the rear seat 42 is clearly indicated to the occupants, and the passenger is prompted to pay attention to the starting of the motorcycle 1.

If the vehicle speed is not zero, then the ECU 100 determines whether or not the acceleration of the vehicle body falls within a predetermined range (step S6). The predetermined range refers to a range of slow accelerations and decelerations including zero acceleration, i.e. a range of accelerations in which it is not necessary to tilt the front seat 41 and the rear seat 42. Stated otherwise, the predetermined range is set to a range of accelerations suitable for the front seat 41 and the rear seat 42 to take the neutral position (for the occupant seat 10 to take the neutral position).

In this case, the ECU 100 determines whether the motorcycle 1 is accelerating (the vehicle speed is increasing) or decelerating (the vehicle speed is decreasing) on the basis of the acceleration detected by the acceleration sensor 104. If the motorcycle 1 is accelerating, then the ECU 100 makes an acceleration correction to estimate an acceleration to be generated after an infinitesimal time from the accelerator opening and the engine rotational speed. If the motorcycle 1 is decelerating, then the ECU 100 makes a deceleration correction to estimate a negative acceleration (deceleration) to be generated after an infinitesimal time on the basis of at least either one of the brake switch 112, the brake fluid pressure, the accelerator opening, and the engine rotational speed. The ECU 100 then makes the decision in step S6 on the basis of the corrected acceleration or deceleration. The ECU 100 is thus able to determine the acceleration on the basis of the acceleration of the vehicle body after an infinitesimal time.

For estimating an acceleration to be generated after an infinitesimal time from the accelerator opening and the engine rotational speed, since the acceleration varies depending on how large the running resistance is, it is preferable to hold characteristic data of the running resistance in advance, specify a running resistance in advance on the basis of latest values of the accelerator opening, the engine rotational speed, and the vehicle speed change, and determine an acceleration from marginal drive power in view of the characteristic data of the specified running resistance. For example, data descriptive of the characteristics of the engine rotational speed, the accelerator opening, and the acceleration in a graph representing drive powers on its vertical axis and speeds on its horizontal axis may be stored as characteristic data of the running resistance, and an acceleration may be determined on the basis of the data thus stored.

Referring back to FIG. 6, if the decision made in step S6 is negative, then the ECU 100 determines whether or not the acceleration is positive (step S7). If the acceleration is positive, then the ECU 100 carries out a second seat rear-up control process (step S8). The second seat rear-up control process is a control process for tilting the rear portions of the front seat 41 and the rear seat 42 upwardly at an angular velocity depending on the acceleration (corrected acceleration) acquired in step S6. The greater the acceleration is, the quicker it is for the rear portions of the front seat 41 and the rear seat 42 to be tilted upwardly, immediately prompting the occupants to take seating postures in readiness for acceleration and further quickly prompting the passenger to pay attention to the acceleration of the motorcycle 1.

If the acceleration is negative, then the ECU 100 carries out a seat front-up control process (step S9). The seat front-up control process is a control process for tilting the front portions of the front seat 41 and the rear seat 42 upwardly to a predetermined front-up position (corresponding to the position shown in FIG. 4C) at an angular velocity depending on the negative acceleration (corrected acceleration) acquired in step S6. The occupant seat 10 now takes the front-up position, prompting the occupants seated respectively on the seating surfaces 41A and 42A of the occupant seat 10 to take riding postures in readiness for deceleration and further prompting the passenger to pay attention to the deceleration of the motorcycle 1.

The greater the acceleration is, the quicker it is for the front portions of the front seat 41 and the rear seat 42 to be tilted upwardly, immediately prompting the occupants to take seating postures in readiness for deceleration and further quickly prompting the passenger to pay attention to the deceleration of the motorcycle 1.

If the decision made in step S6 is positive, then the ECU 100 determines whether or not the front seat 41 and the rear seat 42 take the neutral position, i.e., whether or not the occupant seat 10 takes the neutral position, on the basis of the detected signal from the seat position sensor 110 (step S10). If the front seat 41 and the rear seat 42 do not take the neutral position, then the ECU 100 performs the returning control process for operating the actuators 60 to return the front seat 41 and the rear seat 42 to the neutral position (step S11). In the returning control process, the ECU 100 carries out a control process for returning the front seat 41 and the rear seat 42 to the neutral position by smoothly changing the angular velocities of the front seat 41 and the rear seat 42 in order not to make the passenger feel strange and uncomfortable, e.g., performs a velocity control process for changing the angular velocities according to a sine-wave pattern.

If the front seat 41 and the rear seat 42 take the neutral position, then the ECU 100 temporarily finishes the control process and thereafter carries out step S1. The process described above with reference to FIG. 6 is the control process for controlling the occupant seat 10.

According to this approach, as described above, the occupant seat 10 has the tilting mechanism 50 (50F, 50R) for tilting the seating surfaces 41A and 42A of the front seat 41 (rider seating part) and the rear seat 42 (passenger seating part), and the ECU 100 performs the control process for tilting the seating surfaces 41A and 42A to lift the rear portions of the seats 41 and 42 upwardly depending on a rider's action to accelerate the motorcycle 1 and for tilting the seating surfaces 41A and 42A to lift the front portions of the seats 41 and 42 upwardly depending on a rider's action to decelerate the motorcycle 1. It is thus possible to prompt the occupants seated on the seats 41 and 42 to take appropriate riding postures on the basis of the behavior of the motorcycle 1 and also to indicate a change in the behavior of the motorcycle 1 to the passenger seated on the rear seat 42.

Therefore, the occupants seated on the seats 41 and 42 can easily take appropriate seating postures, and find it comfortable and enjoyable to ride the motorcycle 1 by taking appropriate seating postures. It is also possible for a novice who is not accustomed to driving the motorcycle 1 to improve his/her driving skill. On tandem riding, moreover, movement of the passenger other than the rider can appropriately be reduced, allowing the rider and the passenger to enjoy riding the motorcycle 1.

When the vehicle speed is zero, then if the clutch mechanism of the motorcycle 1 is in a state of transmitted power cut off, and if the transmission of the motorcycle 1 is in any of the gears other than the neutral position, then the ECU 110 decides that the motorcycle 1 is ready to start. When the ECU 110 decides that the motorcycle 1 is ready to start, the ECU 100 carries out the control process for tilting the seating surfaces 41A and 42A to lift the rear portions of the front seat 41 and the rear seat 42 upwardly. When the ECU 110 decides that the motorcycle 1 is not ready to start, the ECU 100 carries out the returning control process for returning the seating surfaces 41A and 42A to the neutral position in which the seating surfaces 41A and 42A lie flatwise horizontally. The occupants seated on the seats 41 and 42 are thus prompted to take appropriate riding postures for the starting of the motorcycle 1, and the passenger seated on the rear seat 42 can be notified of the starting of the motorcycle 1.

When the vehicle speed is other than zero, if the acceleration of the motorcycle 1 is of a positive value equal to or greater than a predetermined level, then the ECU 100 carries out the control process for tilting the seating surfaces 41A and 42A to lift the rear portions of the front seat 41 and the rear seat 42 upwardly. If the acceleration of the motorcycle 1 is of a negative value smaller than the predetermined level, then the ECU 100 carries out the control process for tilting the seating surfaces 41A and 42A to lift the front portions of the front seat 41 and the rear seat 42 upwardly. If the acceleration of the motorcycle 1 falls within the predetermined range, then the ECU 100 carries out the returning control process for returning the seating surfaces 41A and 42A to the neutral position in which the seating surfaces 41A and 42A lie flatwise horizontally. The occupants seated on the respective seats 41 and 42 are thus prompted to take appropriate riding postures depending on the acceleration or deceleration of the motorcycle 1 while it is being driven, and the passenger seated on the rear seat 42 is notified of the acceleration or deceleration of the motorcycle 1.

When the ECU 100 performs the control process for tilting the seating surfaces 41A and 42A, it tilts the seating surfaces 41A and 42A at the angular velocity depending on the acceleration. Therefore, the greater the acceleration is, the quicker the ECU 100 can tilt the seating surfaces 41A and 42A, immediately prompting the occupants to take seating postures in readiness for acceleration and further quickly prompting the occupants to pay attention to the acceleration of the motorcycle 1.

The tilting mechanism 50 has the bases 51 supported on the rear frame 25, the seat 53 tiltably mounted on the bases 51, and the actuator 60 for tilting the seat 53. Consequently, the load applied from the passenger to the seat 53 can be borne by the rear frame 25, and the seat 53 can be appropriately tilted by the actuator 60.

The seat 53 is mounted on the bases 51 for vertically swingable movement about the swing shaft 52A, and the link arms 54 have ends attached to the portion of the seat 53 spaced from the swing shaft 52A and the other ends movable by the actuator 60 to tilt the seat 53. Consequently, the seat 53 can be tilted by a simple structure.

Figure 7:
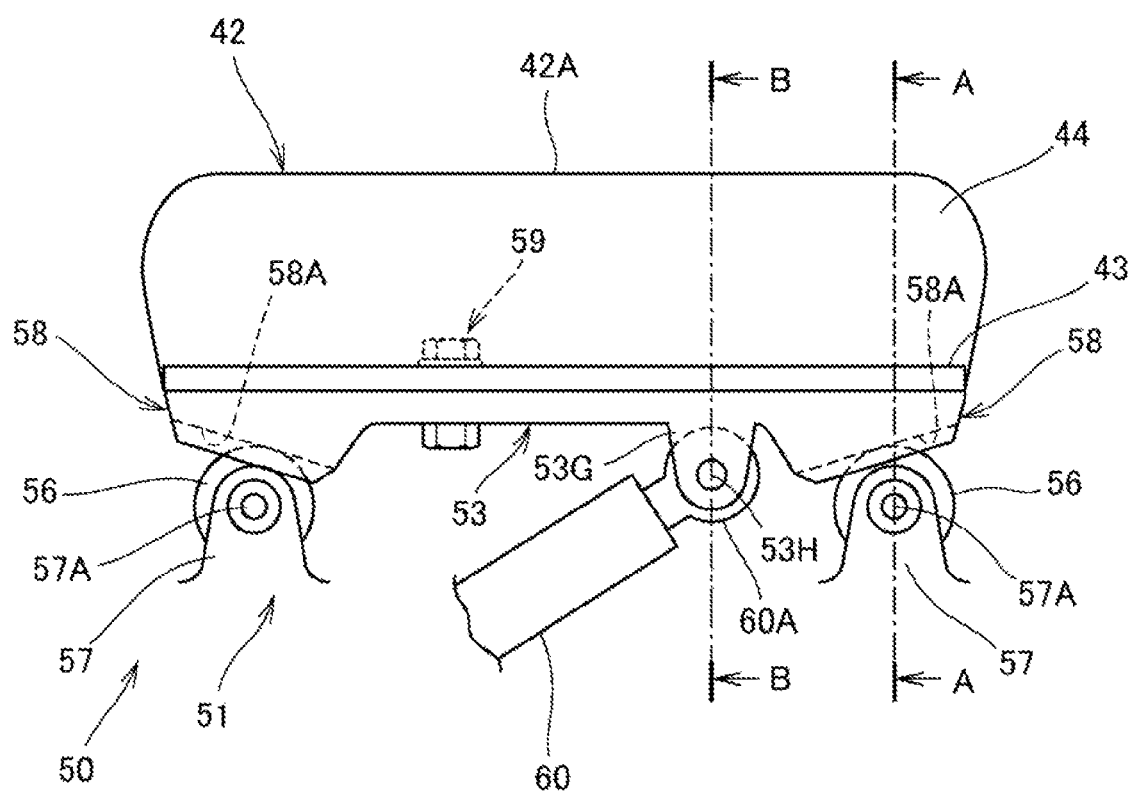
FIG. 7 is a view showing a structure in which a tilting mechanism, according to an exemplary approach, is applied to the rear seat, the view being seen from a side of the rear seat.
Figure 8A:
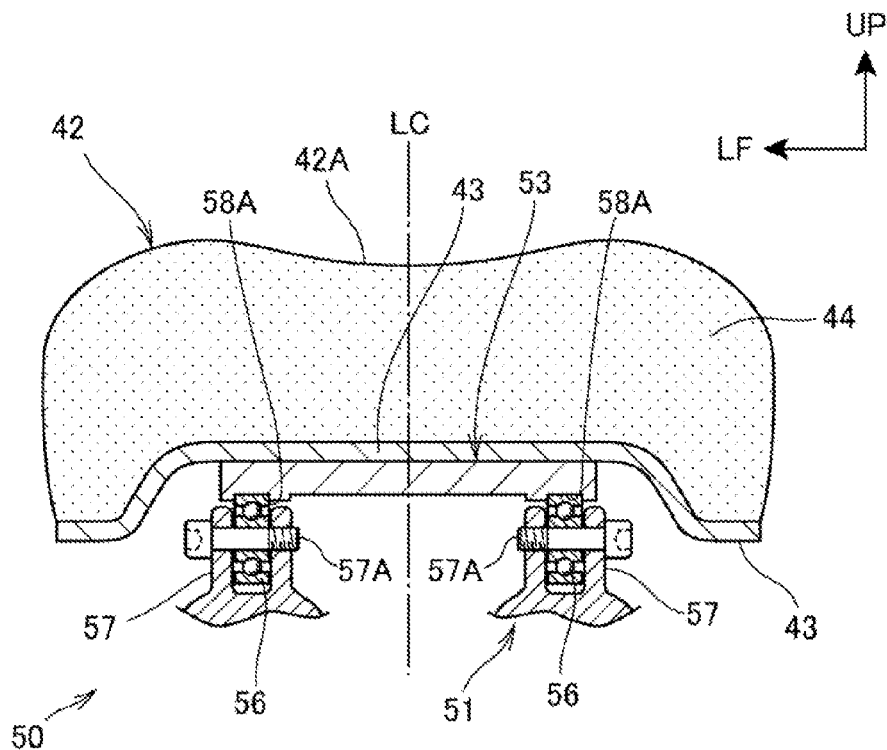
FIG. 8A is a view illustrating the tilting mechanism according to an exemplary approach and is a cross-sectional view taken along line A-A of FIG. 7.
Figure 8B:
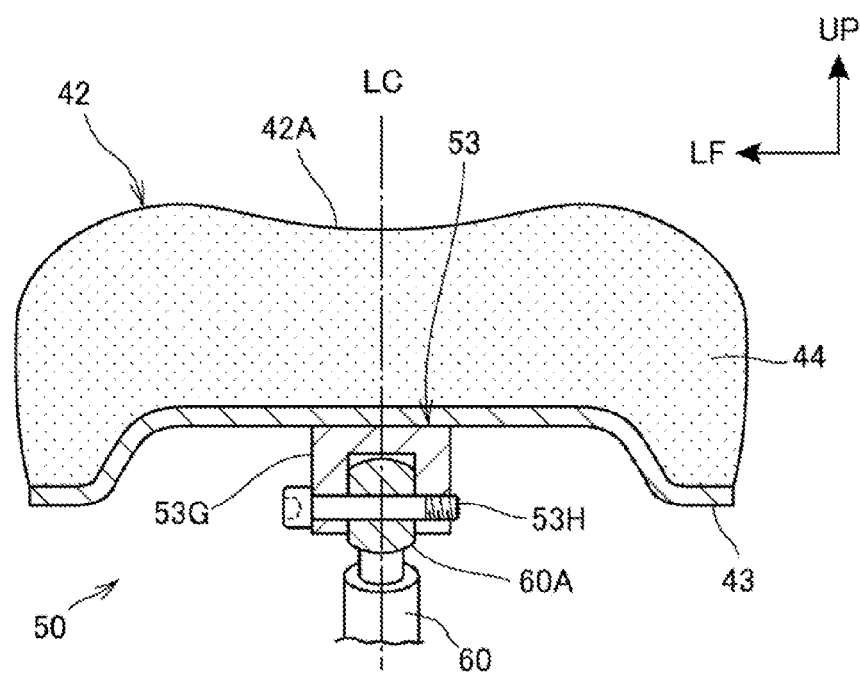
FIG. 8B is a view illustrating the tilting mechanism according to an exemplary approach and is a cross-sectional view taken along line B-B of FIG. 7.

FIG. 7 is a view showing a structure in which a tilting mechanism 50 according another approach in which the rear seat 42, the view being seen from a side of the rear seat 42. FIGS. 8A and 8B are views illustrating the tilting mechanism 50 according to this approach, FIG. 8A being a cross-sectional view taken along line A-A of FIG. 7, FIG. 8B a cross-sectional view taken along line B-B of FIG. 7. In FIGS. 8A and 8B, the reference characters LC indicate a central line in the transverse directions of the vehicle body.

This approach differs from the earlier approach with respect to the shape of a seating surface 42A of a rear seat 42. Those members in this approach which correspond to the members of the earlier approach are denoted by identical reference characters, and different features will be described below.

As shown in FIGS. 7 and 8A, a plurality of roller supports 57 project upwardly from a base 51 and support respective rollers 56 rotatably thereon. The rollers 56 are provided as a pair of laterally spaced left and right rollers on a front lower portion of the rear seat 42 and a pair of laterally spaced left and right rollers on a rear lower portion of the rear seat 42. The rollers 56 include rolling bearings rotatably supported on the roller supports 57 by support shafts 57A.

A seat 53, which has rails 58 with the rollers 56 being rollingly movable thereon in the longitudinal directions of the vehicle body, is fixed to a lower portion of the seat bottom plate 43 of the rear seat 42 by a fastening structure 59 (FIG. 7) which includes a bolt and a nut.

Each of the rails 58 has an upwardly depressed cavity whose bottom surface extends in the longitudinal directions of the vehicle body and serves as a roller-contact surface 58A on which the roller 56 rolls. As shown in FIG. 8A, the rollers 56 are disposed in the respective cavities. When the rollers 56 rotate, the rear seat 42 can move in the longitudinal directions of the vehicle body. The rear seat 42 is prevented from moving laterally.

As shown in FIG. 7, the roller-contact surfaces 58A of the front rails 58 are provided as slanted surfaces that are inclined rearwardly and downwardly. When the rear seat 42 is moved rearwardly from the position shown in FIG. 7, a front portion of the rear seat 42 is lowered. Conversely, when the rear seat 42 is moved forwardly, the front portion of the rear seat 42 is lifted.

The roller-contact surfaces 58A of the rear rails 58 are provided as slanted surfaces that are inclined forwardly and downwardly. When the rear seat 42 is moved rearwardly from the position shown in FIG. 7, a rear portion of the rear seat 42 is lifted. Conversely, when the rear seat 42 is moved forwardly, the rear portion of the rear seat 42 is lowered.

In other words, when the rear seat 42 is moved rearwardly, the front portion of the rear seat 42 is lowered and the rear portion thereof is lifted, so that the seating surface 42A of the rear seat 42 can become a slanted surface whose rear portion is lifted upwardly. When the rear seat 42 is moved forwardly, the front portion of the rear seat 42 is lifted and the rear portion thereof is lowered, so that the seating surface 42A of the rear seat 42 can become a slanted surface whose front portion is lifted upwardly.

The movable member 60A of the actuator 60 is angularly movably coupled by a transverse swing shaft 53H to a swing support 53G that projects downwardly from a transversely central portion of the seat 53, between the front and rear rails 58 of the seat 53. The actuator 60 is mounted on the rear frame 25, and moves the rear seat 42 in a longitudinal direction of the vehicle body by pushing (moving rearwardly) the movable member 60A or pulling (moving forwardly) the movable member 60A.

With this arrangement, when the actuator 60 pushes the movable member 60A, the rear seat 42 is moved rearwardly from the neutral position where the seating surface 42A lies flatwise horizontally as shown in FIG. 7, whereby the seating surface 42A can be tilted with its rear portion lifted upwardly. When the actuator 60 pulls the movable member 60A, the rear seat 42 is moved forwardly from the neutral position shown in FIG. 7, whereby the seating surface 42A can be tilted with its front portion lifted upwardly.

According to this approach, the ECU 100 can operate the actuator 60 to control the seating surface 42A of the rear seat 42 to take the neutral position, the rear-up position, or the front-up position. The ECU 100 controls the occupant seat 10 as similarly described above because of this structure. Consequently, as described above, it is possible to achieve various advantages, i.e., to prompt the passenger or the like seated on the rear seat 42 to take an appropriate riding posture on the basis of the behavior of the motorcycle 1 and also to indicate a change in the behavior of the motorcycle 1 to the passenger or the like seated on the rear seat 42.

The tilting mechanism 50 includes the rollers 56 mounted on the base 51 and the rails 58 mounted on the seat 53 and having the slanted surfaces (roller-contact surfaces 58A) for tilting the seat 53 in response to rolling movement of the rollers 56. Since the actuator 60 moves the seat 53 to cause the rollers 56 to roll on the slanted surfaces (roller-contact surfaces 58A) of the rails 58, the seat 53 can be tilted with low friction by the combination of the rollers 56 and the rails 58.

Inasmuch as the rollers 56 are provided as a plurality of rollers spaced laterally on the front lower portion of the seat 53 and a plurality of rollers spaced laterally on the rear lower portion of the seat 53, the load acting on the seat 53 can be distributed and borne by the rear frame 25, thereby making it possible to tilt the seat 53 smoothly.

In this approach, the pair of left and right rollers 56 is mounted on the front lower portion of the seat 53 and the pair of left and right rollers 56 is mounted on the rear lower portion of the seat 53. However, the number of rollers 56 used may be increased or reduced. The rollers 56 are illustrated as being mounted on the base 51, and the rails 58 are illustrated as being disposed on the seat 53. However, the structure is not limited to this. The rails 58 may be disposed on the base 51, and the rollers 56 may be mounted on the seat 53. The tilting mechanism 50 according to this approach may be applied to the front seat 41.

Figure 9:
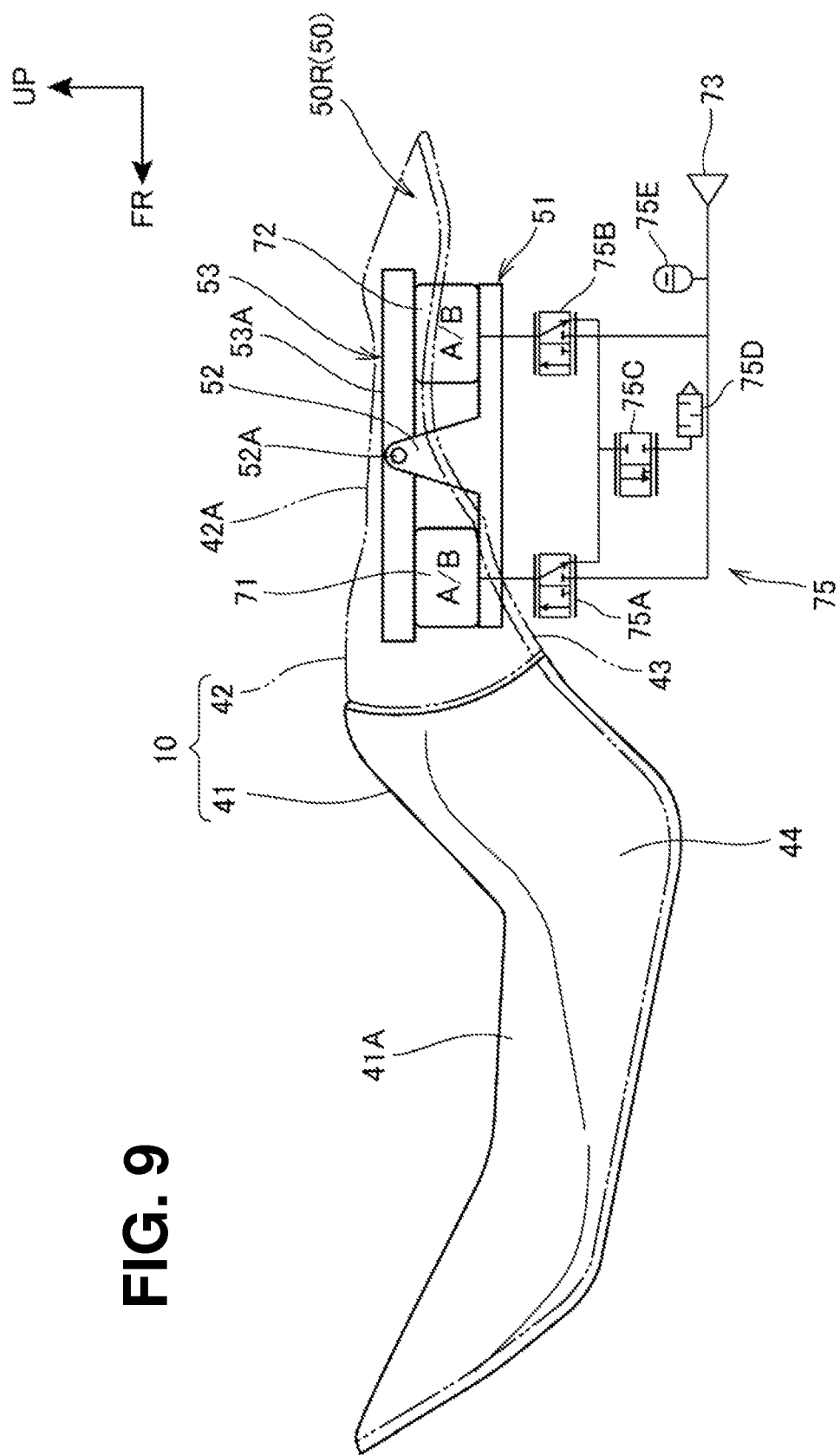
FIG. 9 is a view showing a structure in which a tilting mechanism according to an exemplary approach is applied to the rear seat, the view being seen from a side of the rear seat.

FIG. 9 is a view showing yet another approach to a structure in which a tilting mechanism 50 is applied to the rear seat 42, the view being seen from a side of the rear seat 42. A tilting mechanism 50 of the same structure is also applied to the front seat 41 though it will not be described below because description of the same structure is redundant.

This approach differs from earlier approaches in that an actuator 60 includes expandable bodies 71 and 72 (denoted as "A/B" in FIG. 9) disposed forwardly and rearwardly of the swing shaft 52A, and a fluid pump 73 for expanding and contracting the expandable bodies 71 and 72 to tilt the seat 53. The tilting mechanism 50 according to this approach is free of the link arms 54 described in an earlier approach. Those members of this approach which correspond to the members of the above approaches are denoted by identical reference characters, and different features will be described below.

As shown in FIG. 9, the expandable bodies 71 and 72 that are spaced from each other in the longitudinal directions of the vehicle body are disposed between the base 51 and the seat 53 disposed above the base 51. The expandable bodies 71 and 72 include air bags that can be expanded by a fluid (air in this approach) supplied from a fluid pump 73.

The fluid pump 73 and the expandable bodies 71 and 72 are connected to each other by a fluid circuit 75 including selector valves 75A and 75B (3-port solenoid-operated valves in this approach) for supplying the fluid to and discharging the fluid from the expandable bodies 71 and 72, i.e., selectively introducing air into and discharging air from the expandable bodies 71 and 72, and a selector valve 75C (a 2-port solenoid-operated valve in this approach) for draining the fluid (draining air) discharged from the expandable bodies 71 and 72. In FIG. 9, the reference symbols 75D represent a muffler connected to the discharge sides of the selector valves 75A and 75B, and the reference symbols 75E an accumulator. The selector valves 75A through 75C and the fluid pump 73 are controlled in operation by the ECU 100.

Figure 10A:
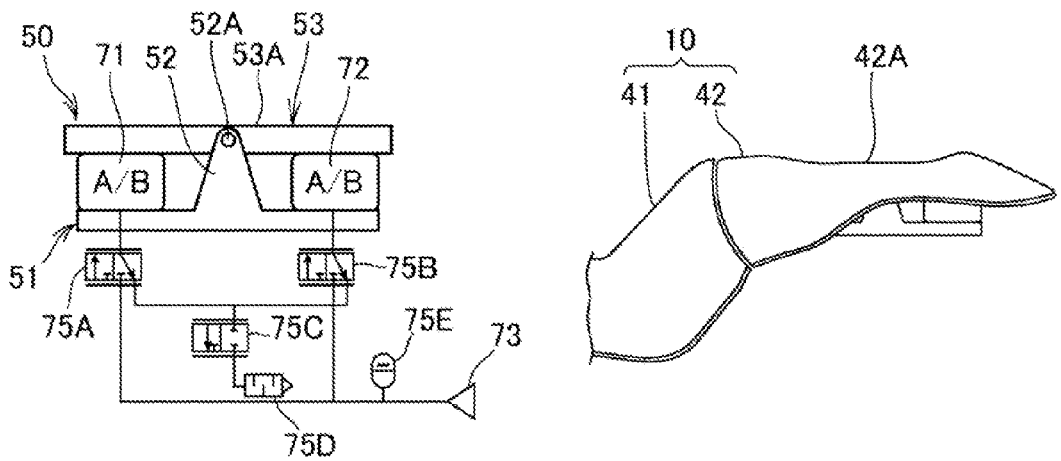
FIG. 10A is a view showing how the posture of the rear seat is changed by the actuator and further showing a state in which the rear seat takes a neutral position.
Figure 10B:
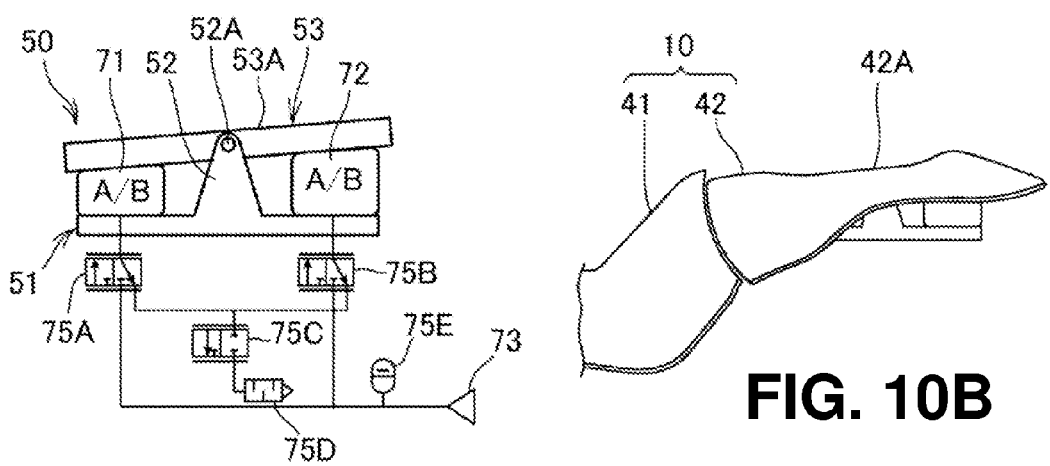
FIG. 10B is a view showing how the posture of the rear seat is changed by the actuator and further showing a state in which the rear seat takes a rear-up position.
Figure 10C:
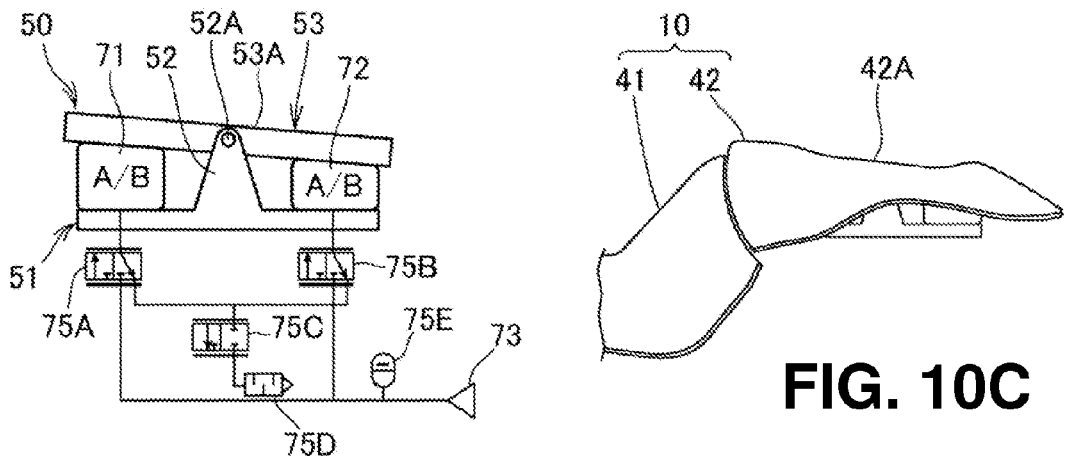
FIG. 10C is a view showing how the posture of the rear seat is changed by the actuator and further showing a state in which the rear seat takes a front-up position.

FIGS. 10A through 10C are views showing how the posture of the rear seat 42 is changed by the actuator 60, FIG. 10A showing a state in which the rear seat 42 takes a neutral position, FIG. 10B a state in which the rear seat 42 takes a rear-up position, and FIG. 10C a state in which the rear seat 42 takes a front-up position.

As shown in FIG. 10A, the actuator 60 supplies a constant pressure to the expandable bodies 71 and 72 to cause the upper surface 53A of the seat 53 to lie flatwise horizontally, holding the rear seat 42 in the neutral position in which the seating surface 42A of the rear seat 42 lies flatwise horizontally.

As shown in FIG. 10B, the actuator 60 contracts the front expandable body 71 and expands the rear expandable body 72 to tilt the upper surface 53A of the seat 53 with its rear portion lifted upwardly, holding the rear seat 42 in the position (rear-up position) in which the seating surface 42A of the rear seat 42 has its rear portion lifted upwardly.

As shown in FIG. 10C, the actuator 60 expands the front expandable body 71 and contracts the rear expandable body 72 to tilt the upper surface 53A of the seat 53 with its front portion lifted upwardly, holding the rear seat 42 in the position (front-up position) in which the seating surface 42A of the rear seat 42 has its front portion lifted upwardly. Air that is drained from the contracted expandable bodies 71 and 72 is discharged out through the muffler 75D.

In this manner, the ECU 100 can operate the actuator 60 to control the seating surface 42A of the rear seat 42 to take the neutral position, the rear-up position, or the front-up position. The ECU 100 can also control the actuator 60 of the front seat 41 to control the seating surface 41A of the front seat 41 to take the neutral position, the rear-up position, or the front-up position. The ECU 100 controls the occupant seat 10 as similarly disclosed in an earlier approach because of this structure. Consequently, as similarly disclosed in an earlier approach, it is possible to achieve various advantages, i.e., to prompt the occupants seated on the respective seats 41 and 42 to take appropriate riding postures on the basis of the behavior of the motorcycle 1 and also to indicate a change in the behavior of the motorcycle 1 to the passenger seated on the rear seat 42.

Since the tilting mechanism 50 according to this approach tilts the occupant seat 10 with the expandable bodies 71 and 72 disposed forwardly and rearwardly of the swing shaft 52A, it is possible to resiliently bear the load applied to the seat 53. In this approach, air is employed as the fluid. However, a fluid other than air may be employed. If a fluid other than air is employed, the discharged fluid is returned to the fluid tank.

Figure 11:
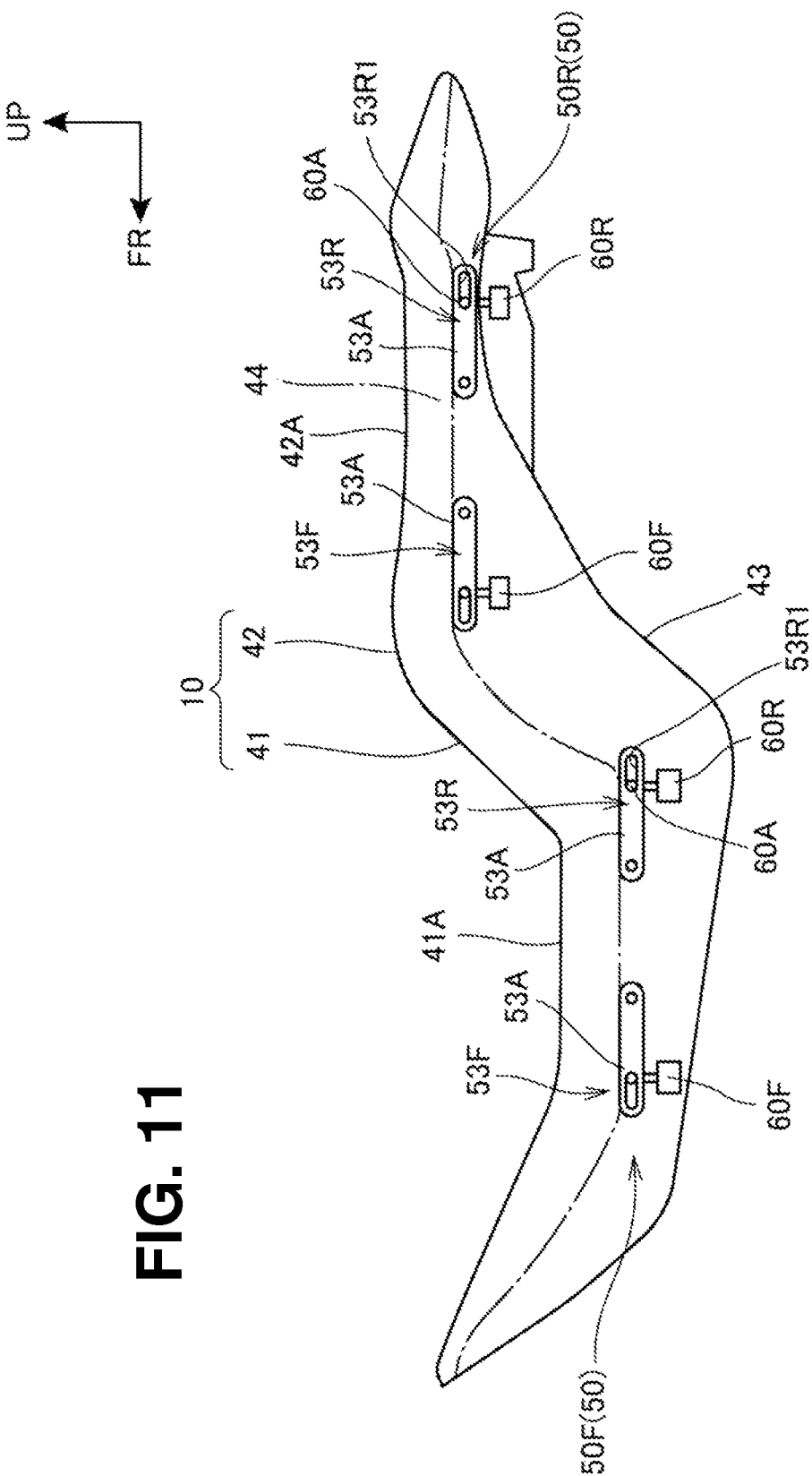
FIG. 11 is a view showing tilting mechanisms according to an exemplary approach of the occupant seat.

FIG. 11 is a view showing tilting mechanisms 50 according to another approach to the disclosed vehicle and the occupant seat 10. According to this approach, a tilting mechanism 50R is provided for a rear seat 42 which includes seats 53 in its front and rear portions (the seat in the front portion is referred to as a seat 53F and the seat in the rear portion as a seat 53R), and a tilting mechanism 50F is provided for a front seat 41 which includes seats 53 in its front and rear portions (the seat in the front portion is referred to as a seat 53F and the seat in the rear portion as a seat 53R). The tilting mechanism 50R for the rear seat 42 and the tilting mechanism 50F for the front seat 41 are structurally identical to each other. Therefore, the tilting mechanism 50R for the rear seat 42 will be described in detail below, and redundant description of the tilting mechanism 50F for the front seat 41 will be omitted. Those members of this approach which correspond to the members of the above approaches are denoted by identical reference characters, and different features will be described below.

Figure 12:
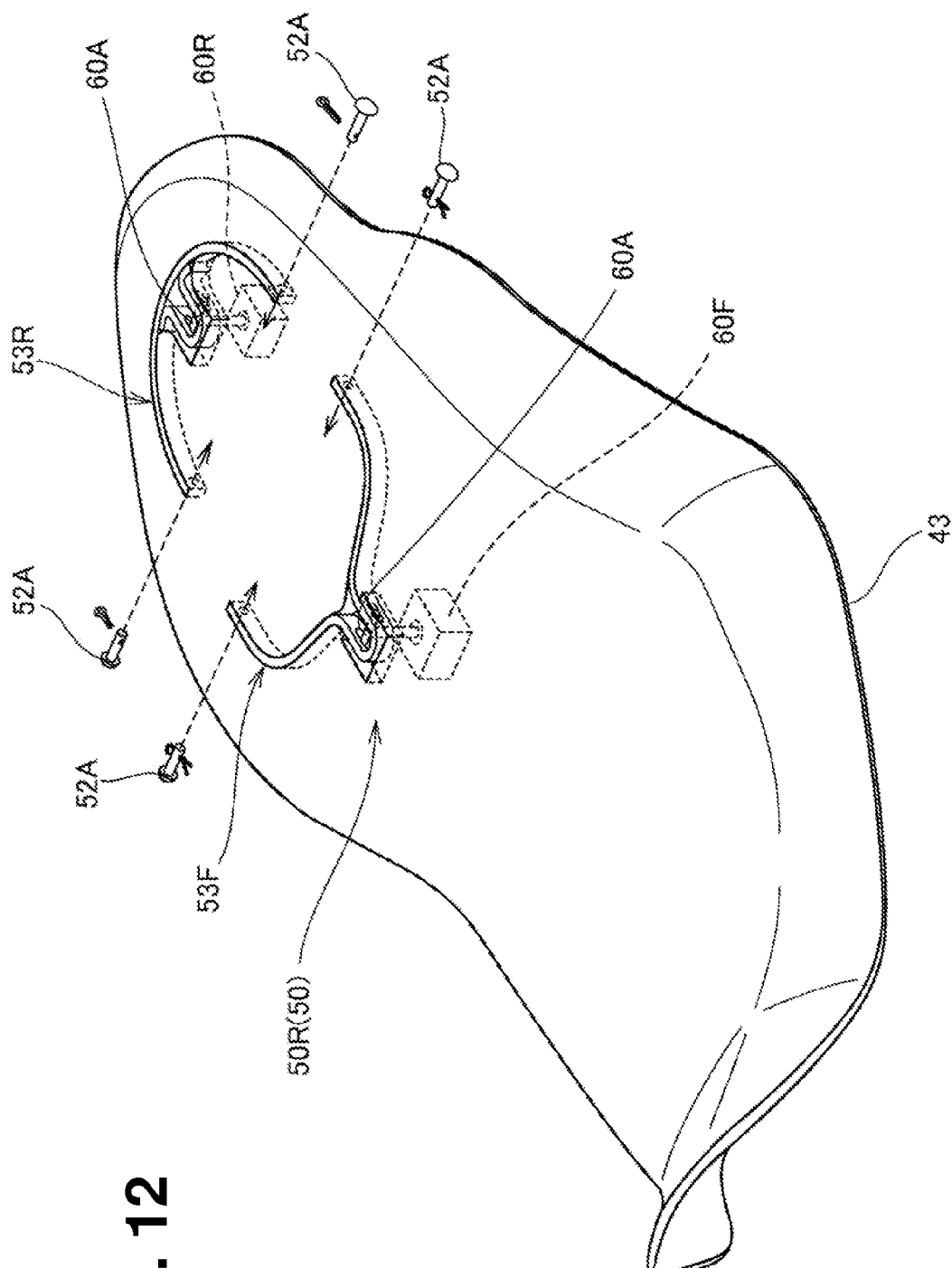
FIG. 12 is a perspective view schematically showing the tilting mechanism for the rear seat and a seat bottom plate.

FIG. 12 is a perspective view schematically showing the tilting mechanism 50 for the rear seat 42 and a seat bottom plate 43. The seat 53F in the front portion is in the form of a U-shaped member which is open rearwardly. The seat 53F is mounted on the seat bottom plate 43 by a pair of left and right swing shafts 52A and supported such that a front end thereof is angularly movable vertically about the swing shafts 52A.

The seat 53R in the rear portion is in the form of a U-shaped member which is open forwardly. The seat 53R is mounted on the seat bottom plate 43 by a pair of left and right swing shafts 52A and supported such that a rear end thereof is angularly movable vertically about the swing shafts 52A.

Actuators 60 are associated with the seats 53F and 53R (the actuator 60 in the front portion is referred to as an actuator 60F and the actuator 60 in the rear portion as an actuator 60R). The actuators 60F and 60R include actuators for vertically moving movable members 60A with a power source such as a motor.

The actuator 60F in the front portion is mounted on the seat bottom plate 43 beneath the front end of the front seat 53F. The movable member 60A is coupled to the seat 53F through an oblong hole 53F1 (FIG. 11) defined in the front end of the seat 53F. When the movable member 60A is vertically moved, it angularly moves the front seat 53F about the swing shafts 52A. The seat 53F is held against a lower surface of the cushion body 44, so that when the seat 53F is angularly moved, the front portion of the seating surface 42A of the rear seat 42 is tilted.

The actuator 60R in the rear portion is mounted on the seat bottom plate 43 beneath the rear end of the rear seat 53R. The movable member 60A is coupled to the seat 53R through an oblong hole 53R1 (FIG. 11) defined in the rear end of the seat 53R. When the movable member 60A is vertically moved, it angularly and vertically moves the rear seat 53R about the swing shafts 52A. The seat 53R is held against a lower surface of the cushion body 44, so that when the seat 53R is angularly moved, the rear portion of the seating surface 42A of the rear seat 42 is tilted.

The actuators 60F and 60R are controlled in operation by the ECU 100. When the actuators 60F and 60R pull the respective movable members 60A into their most retracted positions, the upper surfaces 53A of the seats 53 are caused to lie flatwise horizontally, holding the rear seat 42 in the neutral position in which the seating surface 42A of the rear seat 42 lies flatwise horizontally as shown in FIG. 11.

Figure 13A:
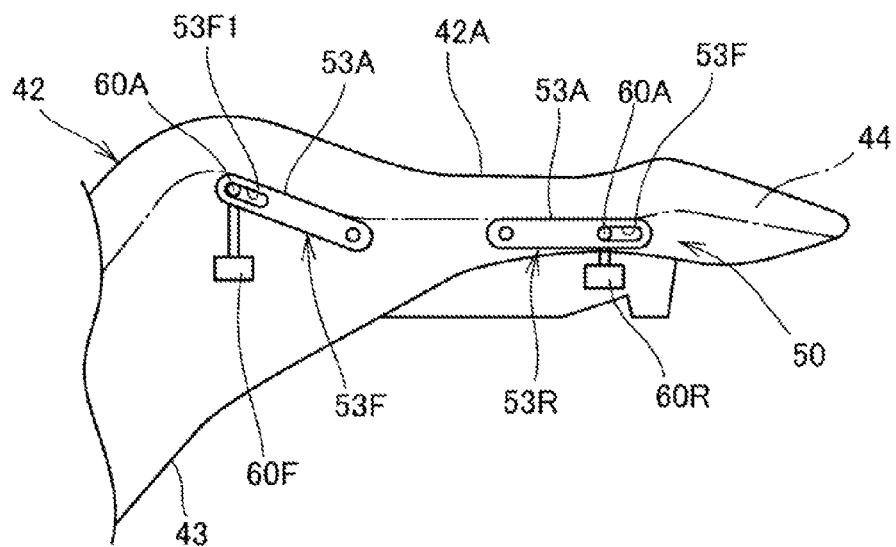
FIG. 13A is a view showing how the posture of the rear seat is changed by the actuators and further showing a state in which the rear seat takes a front-up position.
Figure 13B:
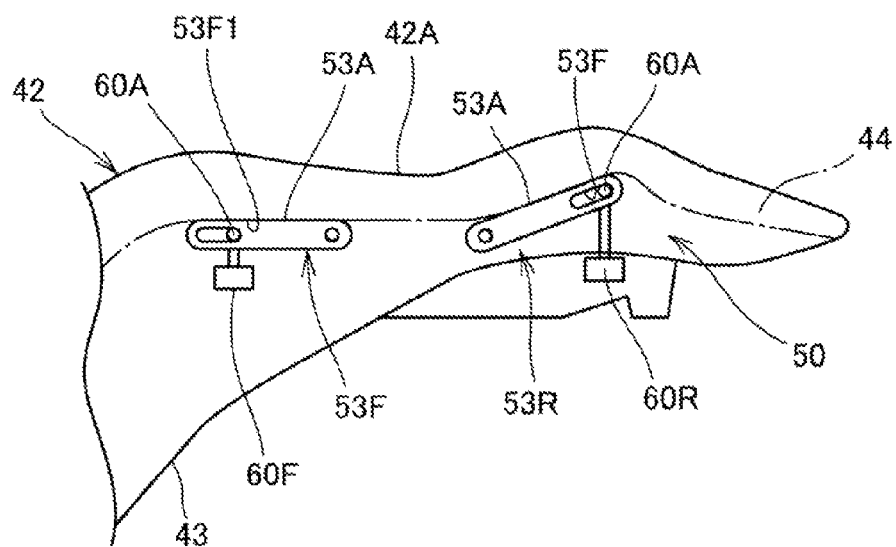
FIG. 13B is a view showing how the posture of the rear seat is changed by the actuators and further showing a state in which the rear seat takes a rear-up position.

FIGS. 13A and 13B are views showing how the posture of the rear seat 42 is changed by the actuators 60, FIG. 13A showing a state in which the rear seat 42 takes a front-up position and FIG. 13B a state in which the rear seat 42 takes a rear-up position.

As shown in FIG. 13A, when the movable member 60A of the front actuator 60F is pushed to tilt the front portion of the front seat 53F upwardly, and the movable member 60A of the rear actuator 60R is pulled to make the rear seat 53R flatwise horizontally, the seating surface 42A of the rear seat 42 has its front portion lifted upwardly (front-up position).

As shown in FIG. 13B, when the movable member 60A of the front actuator 60F is pulled to make the front seat 53F flatwise horizontally, and the movable member 60A of the rear actuator 60R is pushed to tilt the rear portion of the rear seat 53R upwardly, the seating surface 42A of the rear seat 42 can have its rear portion lifted upwardly (rear-up position).

In this manner, the ECU 100 operates the actuators 60 to control the seating surface 42A of the rear seat 42 to take the neutral position, the rear-up position, or the front-up position. The ECU 100 can also control the actuators 60 of the front seat 41 to control the seating surface 41A of the front seat 41 to take the neutral position, the rear-up position, or the front-up position. The ECU 100 controls the occupant seat 10 as similarly disclosed in earlier approaches because of this structure. Consequently, as with earlier approaches, it is possible to achieve various advantages, i.e., to prompt the occupants seated on the respective seats 41 and 42 to take appropriate riding postures on the basis of the behavior of the motorcycle 1 and also to indicate a change in the behavior of the motorcycle 1 to the passenger seated on the rear seat 42.

Since the tilting mechanism 50 according to this approach respectively includes the seats 53F and 53R for the front and rear portions of each of the seating surfaces 41A and 42A of the occupant seat 10 and tilts the seats 53F and 53R to control the seating surfaces 41A and 42A to take the neutral position, the rear-up position, or the front-up position, the front and rear portions of the seating surfaces 41A and 42A can independently be controlled for achieving various tilted positions.

The seats 53F and 53R are tiltably mounted on the seat bottom plate 43 which serves as the seat frame (frame member) of the occupant seat 10. The tilting mechanism 50 can be thus supported using the seat frame.

According to this approach, the actuators 60F and 60R are provided for operating the respective seats 53F and 53R independently. However, the tilting mechanism 50 may be arranged to operate all the seats 53F and 53R with a single actuator 60.

The above approaches represent an aspect of the present disclosure only, and may be modified or applied without departing from the scope of the present disclosure. For example, in the above approaches, the ECU 100 may perform a control process for changing the angles of the seating surfaces 41A and 42A of the front seat 41 and the rear seat 42 depending on the acceleration (including the deceleration) of the motorcycle 1. This arrangement makes it possible to a change in the acceleration/deceleration and the degree thereof to the passenger, etc.

For example, the tilting mechanism 50 (including the seat 53) may be provided in each of the front and rear portions of the seats 41 and 42 for tilting the seats 53 to control the seats 41 and 42. With this arrangement, the front and rear portions of the seating surfaces 41A and 42A can independently be controlled for achieving various tilted positions.

In the above approaches, the present disclosure is illustrated as being applied to the motorcycle 1. However, the present disclosure is not limited to this. The present disclosure may widely be applied to vehicles such as saddle-type vehicles having a seating assembly for an occupant to be seated thereon. The saddle-type vehicles include vehicles in general where an occupant rides astride of the vehicle body, and are not limited to motorcycles (including bicycles with a prime mover). It should be apparent that the power unit of vehicles to which the present disclosure is applied may be other than the engine 6, but may be an electric motor, for example.

The invention claimed is:

1. A vehicle including a seating assembly for an occupant to be seated thereon and a tilting mechanism tilting said seating assembly, the vehicle comprising:
   a controller configured to control said tilting mechanism, and
   wherein said tilting mechanism serves as a mechanism for tilting a seating surface of said seating assembly, and said controller carries out a first control process for tilting said seating surface such that said seating assembly has a rear portion lifted upwardly on a basis of acceleration of said vehicle and a second control process for tilting said seating surface such that said seating assembly has a front portion lifted upwardly on a basis of deceleration of said vehicle, and
   wherein said controller decides that the vehicle is ready to start when a clutch of the vehicle cuts off power transmission and a transmission of the vehicle is in other than a neutral position when a vehicle speed of the vehicle is zero, and carries out the first control process for tilting said seating surface such that said seating assembly has the rear portion lifted upwardly when said controller decides that the vehicle is ready to start, and carries out a third control process for returning said seating surface into a position in which said seating surface lies flatwise horizontally when said controller decides that the vehicle is not ready to start.

2. The vehicle including the seating assembly, according to claim 1, wherein said controller carries out the first control process for tilting said seating surface such that said seating assembly has the rear portion lifted upwardly when the vehicle is having a positive acceleration equal to or greater than a predetermined value when the vehicle speed of the vehicle is other than zero, carries out the second control process for tilting said seating surface such that said seating assembly has the front portion lifted upwardly when the vehicle is having a negative acceleration smaller than the predetermined value, and carries out the third control process for returning said seating surface into a position in which said seating surface lies flatwise horizontally when the acceleration of the vehicle falls within a predetermined range.

3. The vehicle including the seating assembly, according to claim 1, wherein an angle of said seating surface of said seating assembly is changed depending on the acceleration of the vehicle in the first control process for tilting said seating surface.

4. The vehicle including the seating assembly, according to claim 1, wherein said tilting mechanism includes
   a base supported on a frame of the vehicle,
   a seat tiltably mounted on said base, and
   an actuator tilting said seat.

5. The vehicle including the seating assembly, according to claim 4, wherein said seat is mounted on said base for vertical swinging movement about a swing shaft, and an end of a link arm is coupled to a portion of said seat which is spaced from said swing shaft, and said seat is tilted when another end of said link arm is moved by said actuator.

6. The vehicle including the seating assembly, according to claim 4, further comprising:
   a roller mounted on either one of said base and said seat; and
   a rail mounted on the other one of said base and said seat and having a slanted surface for tilting said seat in response to rolling movement of said roller,
   wherein said actuator moves said seat to cause said roller to roll on said slanted surface of said rail.

7. The vehicle including the seating assembly, according to claim 6, wherein said roller includes a plurality of rollers spaced laterally on a front lower portion of said seat and a plurality of rollers spaced laterally on a rear lower portion of said seat.

8. The vehicle including the seating assembly, according to claim 4, wherein said actuator includes expandable bodies disposed forwardly and rearwardly of a swing shaft and a fluid pump expanding or contracting said expandable bodies to tilt said seat.

9. The vehicle including seating assembly, according to claim 4, wherein said seat includes seats disposed in front and rear portions of said seating assembly.

10. The vehicle including the seating assembly, according to claim 1, wherein said tilting mechanism includes a plurality of seats tiltably mounted on a frame member of said seating assembly and tilting each of front and rear portions of said seating surface, and an actuator tilting each of said seats.

* * * * *